US010445822B2

(12) United States Patent
Perrier et al.

(10) Patent No.: US 10,445,822 B2
(45) Date of Patent: Oct. 15, 2019

(54) SYSTEM AND METHOD FOR GENERATING AND SUPPLYING VIEWER CUSTOMIZED MULTIMEDIA PRESENTATIONS

(71) Applicant: Autodata Solutions, Inc., El Segundo, CA (US)

(72) Inventors: Gregory T. Perrier, London (CA); Hans Otten, London (CA); Robert Giguere, London (CA); Andrew Awaijane, Minneapolis, MN (US)

(73) Assignee: Autodata Solutions, Inc., El Segundo, CA (US)

( * ) Notice: Subject to any disclaimer, the term of this patent is extended or adjusted under 35 U.S.C. 154(b) by 379 days.

(21) Appl. No.: 15/466,539

(22) Filed: Mar. 22, 2017

(65) Prior Publication Data
US 2017/0278179 A1 Sep. 28, 2017

Related U.S. Application Data

(60) Provisional application No. 62/313,075, filed on Mar. 24, 2016.

(51) Int. Cl.
| | |
|---|---|
| G06Q 30/06 | (2012.01) |
| G06F 16/44 | (2019.01) |
| G06Q 99/00 | (2006.01) |
| G06Q 90/00 | (2006.01) |

(Continued)

(52) U.S. Cl.
CPC ......... *G06Q 30/0643* (2013.01); *G06F 3/165* (2013.01); *G06F 16/44* (2019.01);
(Continued)

(58) Field of Classification Search
CPC .......... G06Q 30/0643; G06Q 30/0601; G06Q 30/0621; G06Q 90/00; G06Q 99/00;
(Continued)

(56) References Cited

U.S. PATENT DOCUMENTS

| | | | |
|---|---|---|---|
| 10,249,182 B1 * | 4/2019 | Turner | G08C 17/02 |
| 2008/0262980 A1 * | 10/2008 | Weiss | A63H 17/002 |
| | | | 705/500 |

(Continued)

OTHER PUBLICATIONS

2013-R26442, Oct. 2013, Derwent, Elkins et al.*
(Continued)

*Primary Examiner* — Yogesh C Garg
(74) *Attorney, Agent, or Firm* — Rutan & Tucker, LLP

(57) ABSTRACT

A system includes a content generation subsystem that features a playlist controller and multimedia service logic. The playlist controller is configured to generate a presentation playlist that controls retrieval and playback of audio clips along displayable images. The multimedia service logic, in response to receiving at least a vehicle identification number from the playlist controller, (i) automatically determines vehicle option codes associated with the vehicle, each vehicle option code identifies an option installed on the vehicle; (ii) automatically translate the vehicle option codes into information that is used in recovery of a plurality of text descriptions directed to features of the vehicle, and (iii) automatically determine the a plurality of audio clip links corresponding to the plurality of text descriptions that are used in the formation of the playlist. The second plurality of audio clip links is greater in number than the first plurality of audio clip links.

16 Claims, 12 Drawing Sheets

(51) Int. Cl.
    *G06F 3/16*     (2006.01)
(52) U.S. Cl.
    CPC ..... *G06Q 30/0601* (2013.01); *G06Q 30/0621* (2013.01); *G06Q 90/00* (2013.01); *G06Q 99/00* (2013.01); *G06Q 2230/00* (2013.01)
(58) Field of Classification Search
    CPC .......... G06Q 2220/145; G06Q 2230/00; G06F 16/44; G06F 3/165
    USPC ...................................... 705/27.1, 26.1, 26.5
    See application file for complete search history.

(56) References Cited

U.S. PATENT DOCUMENTS

| | | | |
|---|---|---|---|
| 2010/0042508 A1* | 2/2010 | Bundy | G06Q 30/00 705/26.1 |
| 2013/0268298 A1* | 10/2013 | Elkins | G06Q 40/00 705/4 |
| 2015/0363855 A1* | 12/2015 | Wu | G06Q 30/0621 705/26.5 |
| 2016/0034590 A1* | 2/2016 | Endras | G06F 16/9535 707/770 |
| 2016/0210795 A1* | 7/2016 | Shin | G07C 5/008 |
| 2016/0247331 A1* | 8/2016 | Cacabelos | G07C 5/0808 |

OTHER PUBLICATIONS

Article, "2004 Echo Hatchback pricing released, full details on the net"; published in 2004 in Canada News Wire [Ottawa] Jun. 10, 2003: 1; extracted from Dialog solutions on May 24, 2019.*

Article, I-Car training profile—Part 6: Collision repair 2000 Kolsky, Mark. Automotive Body Repair News37.12: 70. UBM Americas. (Dec. 1998) from Dialog solutions on May 24, 2019.*

* cited by examiner

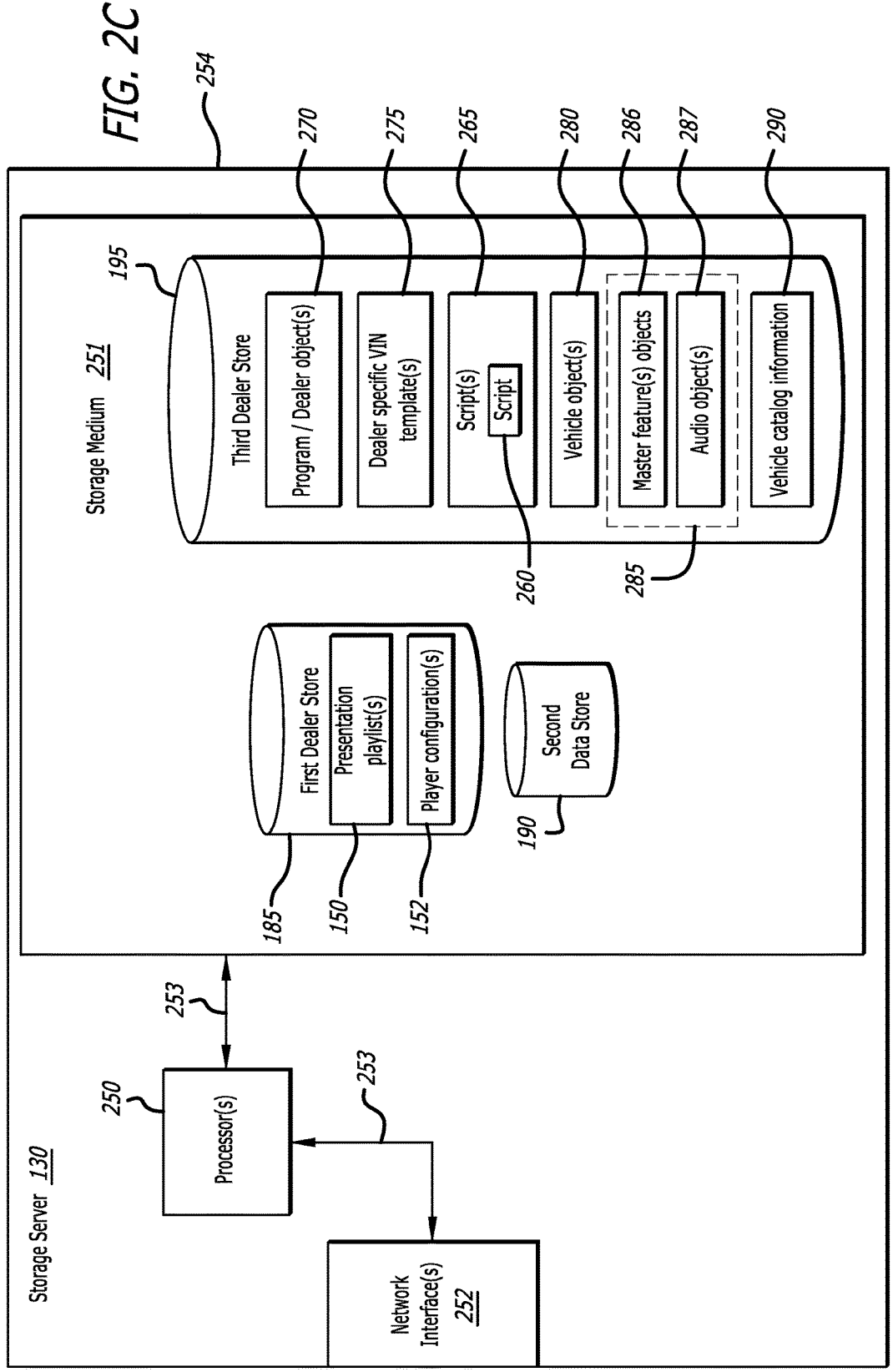

```
"Playlist" : {
    "InitialPresentation" : {
        "Type": "video",
        "Url":
"http://abc.us/player/player_presentation.php?a=1"
    },
    "MenuLayout_AuxContent": {
        "Layout": "location of menu etc..." ,
        "Menuorder" : [
            {
                "Title" : "Warranty" ,
                "Presentation" : {
                    "Type" : "video" ,
                    "Url" :
"http://demo.abc.us/player/player_presentation.php?a=2"
                }
            },
            {
                "Title" : "Lease" ,
                "Presentation" : {
                    "Type" : "video" ,
                    "Url" :

•
                    •
                    •

"DealerDetails" : {
        "Id": "1"
        "Name" : "Test Dealer Name",
        "Address" : {
            "Street" : "1 Road" ,
            "City" : "London" ,
            "Region" : "Ontario" ,
            "PostalZip": "N5W4R4" ,
            "Country" : "Canada"
        },
        "Phone" :  "XXX-XXX-XXXX",
        "Comment" : "This is a great car"
    },
    "DealerPlayerConfig" : {
        "AutoPlay" : true,
        "ContactForm" :
    },
}
```

```
"Presentations":
[
    {
        "Type": "Animation Player Presentation",
        "Title ": "2016 Cadallac CTX Features Video",
        "BackgroundMusicTracks": [
            {
                "Id" : "5555",
                "Duration" : "8.10"
                "Url" : "music/clip-1.mp3",
                "Title" : "Light Piano",
                "Type" : "Music",
                "Category" : "Music",
            },
            {
                "Id" : "5556",
                "Duration" : "51.90"
                "Url" : "music/clip-2.mp3",
                "Title" : "Piano Trap Beat",
                "Type" : "Music",
                "Category" : "Music"
            }
        ],
        "AudioPlayList" : [
            {
                "Id" : "3000",
                "Text" : "Here's a 2015"
                "Duration" : "1.5673469387755101",
                "Title" : "Light Piano",
                "Url" :
"http://demo.abc.us/player/sounds/cadillac_srx/1_Heres_a2015.mp3",
                "Title" : "Year",
                "Type" : "Intro"
                "Category" : "Intro"
            },
            {
                "Id" : "3001",
                "Text" : "Cadillac"
                "Duration" : "0.6791836734693878",
                "Url" :
"http://demo.abc.us/player/sounds/cadillac_srx/2_cadillac.mp3",
```

⎫
⎬ 150
⎭

```
                "Title" : "Make",
                "Type" : "Intro"
                "Category" : "Intro"
            },
            {
                    ⋮
        ],
        "ImagePlayList" : [
            {
                "Url" :
"http://demo.abc.us/player/images/image1.jpg",
                "Transition" : "zoom_in",
                "Transitionparam" : { },
                "Duration" : "500"
            },
            {
                "Url" :
"http://demo.abc.us/player/images/image2.jpg",
                "Transition" : "roll_in_top",
                "Transitionparam" : { },
                "Duration" : "500"
                        ⋮
            },
        "CalloutPlayList" : [
            {
                "Callout" : "MPG",
                "CalloutParams" : { },
                "Start" : "1500"
                "Duration" : "50"
            },
            {
                "Callout" : "Image",
                "CalloutParams" : { },
                "Start" : "500"
                "Duration" : "50"
                        ⋮
        ]
```
} 150

FIG. 7C

SYSTEM AND METHOD FOR GENERATING AND SUPPLYING VIEWER CUSTOMIZED MULTIMEDIA PRESENTATIONS

CROSS-REFERENCE TO RELATED APPLICATION

This application claims the benefit of priority on U.S. Provisional Application No. 62/313,075, filed Mar. 24, 2016, the entire contents of which are incorporated by reference herein.

FIELD

Embodiments of the disclosure relate to the field of network data delivery. More specifically, one embodiment of the disclosure relates to a system that, in response to receipt of a vehicle identifier as input, automatically selects audio for creation of a playlist that is responsible for the assembly of a multimedia vehicle presentation customized for a specific viewer.

GENERAL BACKGROUND

In most geographic areas around the world, vehicles are used by persons as a mode of transportation from one geographic location to another. Currently, there are many types of vehicles used for transportation. One type of vehicle is an automobile that includes a chassis supported by four or more wheels (e.g., a car or a truck). Another type of vehicle is a motorized vehicle having less four wheels, which may be in the form of a motorcycle or a scooter for example. All of these vehicles allow a person to travel a greater distance in a shorter period of time than the person could travel by foot.

In many cases, these vehicles are purchased from a third-party provider, sometimes referred as a "dealer", who may operate as an agent for a vehicle manufacturer. With the increased popularity of the Internet over the last decade, a greater number of purchasing decisions for vehicles are being made after reviewing materials on a dealer website (e.g., a website hosted by the dealer or a website hosted by a third party having a business relationship with the dealer). For instance, a person interested in learning about certain vehicles, referred to as a "viewer," may access the dealer website, review vehicle inventory, and locate a vehicle of interest.

Currently, dealer websites provide a viewer with access to multiple images of a vehicle in inventory (e.g., exterior and interior images of the vehicle). Additionally, some sophisticated dealer web sites provide the viewer with access to videos of different vehicle types (e.g., videos formatted in accordance with MPEG-4 "MP4" coding format), but these MP4 videos normally are rendered, continuous video clips directed to a year/make/model of a vehicle. The MP4 video files tend to be generic (i.e., not vehicle specific) because professionally scripted videos on a per vehicle basis would be infeasible, from an expense and labor perspective. Also, these MP4 video files are not customizable for each viewer, and thus, the content of each MP4 video is not tailored to the specific persona of the viewer requesting the MP4 video file. Hence, content that may be interesting in facilitating a purchasing decision by the viewer is not prioritized. In an age where persons have limited time to shop, currently provided MP4 videos are becoming less and less effective as a selling tool unless a change on the delivery of such content is drastically changed.

BRIEF DESCRIPTION OF THE DRAWINGS

Embodiments of the disclosure are illustrated by way of example and not by way of limitation in the figures of the accompanying drawings, in which like references indicate similar elements and in which:

FIG. 2C is an illustrative embodiment of the physical architecture of the storage subsystem of FIG. 1.

FIG. 7A is an illustrative embodiment of pseudo-code for the player configuration of FIG. 4.

FIGS. 7B and 7C collectively illustrate an embodiment of pseudo-code for the presentation playlist of FIG. 4.

DETAILED DESCRIPTION

Figure 1:
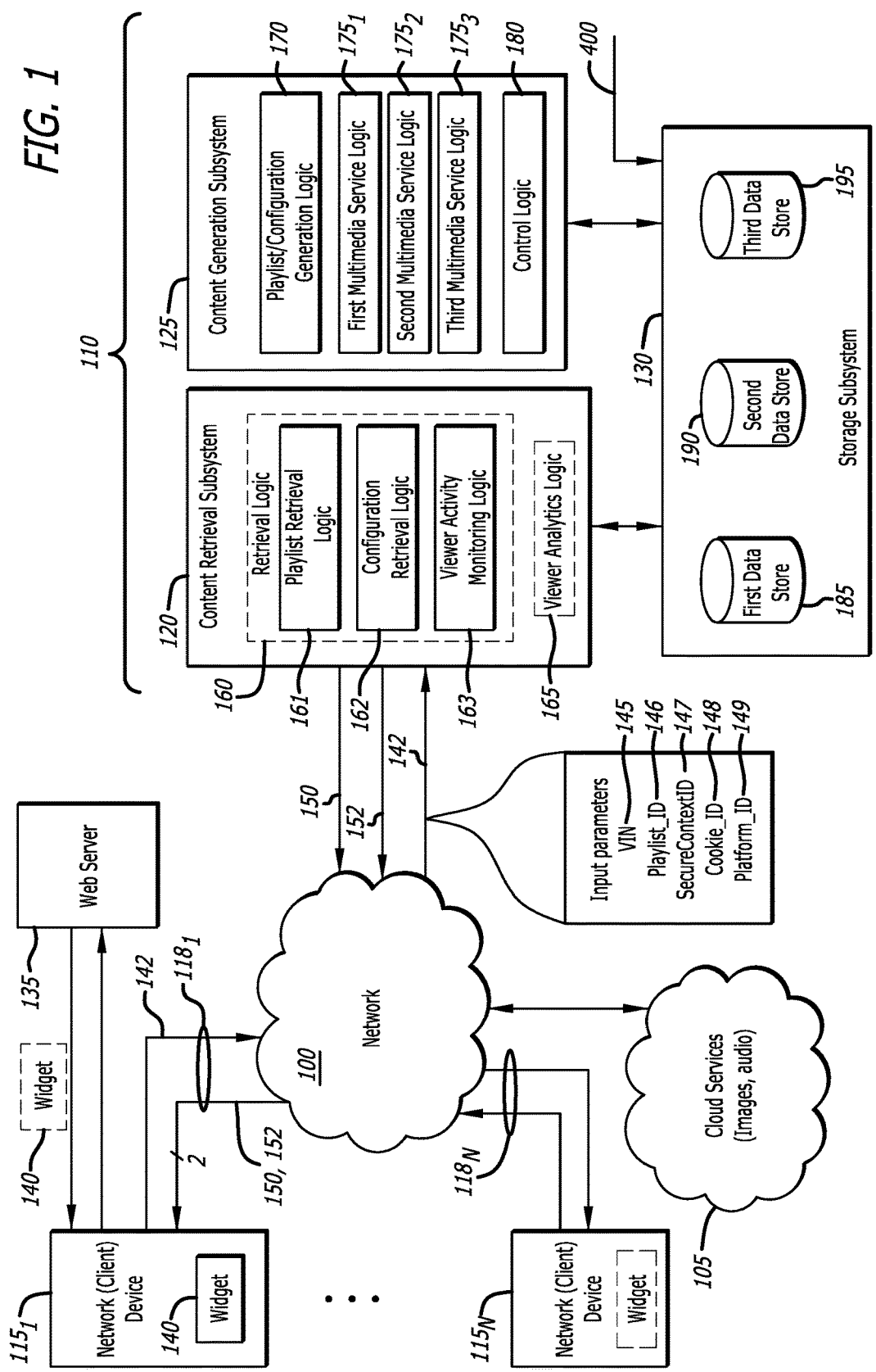
FIG. 1 is a block diagram of an exemplary embodiment of an automated, content delivery system.

One embodiment of the disclosure is directed to an automated, content delivery system that generates and delivers a presentation playlist and/or player configuration over a network. A presentation playlist is responsible for controlling a coordinated download and/or playback of selected display images and audio clips (content) by a presentation player to form a render-less, multimedia presentation of a vehicle (hereafter "vehicle presentation"). The player configuration is responsible for the arrangement of displayed attributes of the player and information agnostic to the vehicle such as text or image overlays. An illustrative embodiment of the content delivery system is described below.

In response to receipt of certain information associated with a vehicle that is the subject for the multimedia presentation, logic deployed within the content delivery system retrieves audio clips that may be used in the formation of a multimedia presentation. The retrieval of the audio clips is automatic, namely responsive to an input and without human intervention. Herein, the vehicle information that triggers retrieval of the audio clips may include a vehicle object, namely a stored data structure that includes information identifying a vehicle and its characteristics. According to one embodiment of the disclosure, the "vehicle object" includes at least an identifier for a vehicle being the subject of a multimedia presentation (e.g., vehicle identification number "VIN") and optionally unstructured text (e.g., text descriptions of one or more vehicle options generated by a dealer).

More specifically, in response to receipt of a VIN unique to a particular vehicle, multimedia (audio) service logic within the content delivery system automatically translates, without human intervention, manufacturer-supplied vehicle option codes into information for use in recovery of a plurality of text descriptions. Each text description is associated with a different feature of the vehicle. The multimedia (audio) service logic is further configured to automatically recover audio clips that correspond to the plurality of text descriptions. Used as a timeline in the formation of a presentation playlist, these audio clips may be assigned rankings that are applied when the presentation playlist is customized according to one or more presentation adjustment factors (e.g., vehicle category, certain geographic location of the vehicle, assigned viewer profile, etc.). Hence, each pre-assigned ranking may be used in the selection and ordering of audio clips that are referenced in a presentation playlist.

Herein, for a particular vehicle, a plurality of presentation playlists may be generated depending on the number of presentation adjustment factors and sub-factors (e.g., number of prescribed viewer profiles) utilized by the content delivery system. Increased granularity of the presentation adjustment factors (and sub-factors) provides vehicle presentation customization on a viewer-by-viewer basis.

According to one embodiment of the disclosure, the multimedia (audio) service logic includes a plurality of components. A first component of the multimedia (audio) service logic may be configured to automatically analyze incoming data (e.g., a VIN) and identify vehicle option codes associated with a vehicle represented by the VIN. Each "vehicle option code" is a prescribed value that is used by a particular original equipment manufacturer (OEM) to identify what options are installed on a vehicle identified by the VIN. These options may include standard options that are available for vehicles having a particular vehicle trim (e.g., automatic transmission, 19-inch wheels, cloth interior, etc.) and factory-ordered (non-standard) options that may constitute upgrades (e.g., leather interior, heated seats, lumbar support seating, 21-inch wheels, etc.). According to one embodiment, the vehicle option codes may be retrieved from "build data," data normally provided by an OEM that identifies all of the vehicle option codes for each specific vehicle (VIN). The build data may include vehicle option codes for millions of vehicles that are categorized by their VINs.

According to another embodiment, the textual descriptions (unstructured text) that are associated with a vehicle can be used to identify some of the option codes for a specific vehicle (VIN). For instance, vehicles may be further customized after manufacture by the OEM. Dealers may include additional features (accessories) that were not present at manufacture. Also, for used cars being sold, prior owners may add or remove features, where the unstructured text may be used to capture these additional features and/or the removed features.

In response to receipt of the vehicle option codes, a second component of the multimedia (audio) service logic is configured to translate these option codes (and/or unstructured text) into metadata. The metadata may include comparison codes. Each "comparison code" provides specific information pertaining to the vehicle identified by the VIN. According to one embodiment of the disclosure, the specific information may include an answer to a particular question that is part of a base of questions, where the number of questions may depend on the desired system granularity (e.g., thousands of questions). In many cases, multiple comparison codes collectively identify a feature of the vehicle. The second component, sometimes referred to as a run-time vocabulary engine (RVE), is described in U.S. Pat. No. 8,661,032, which is owned by the assignee of the subject application and the entire contents of which are incorporated by reference herein. Alternatively, or in combination with the comparison codes, the metadata may further include "brand codes," which identify the brand name of certain items that qualify an option of a vehicle.

A third component within the multimedia (audio) service logic is configured to determine, based at least on the received metadata (e.g., comparison codes and/or brand codes), what master features pertain to the vehicle. A "master feature" includes a text description of any feature of the vehicle, which may correspond to a combination of metadata features (or comparison codes). Thus, a master feature may be represented by an aggregate of a plurality of comparison codes (and optionally brand codes). Of course, a master feature of the vehicle may also correspond to an award, accolade, review, incentive information, third-party vehicle rating, or the like.

Thereafter, for each determined master feature that pertains to the vehicle identified by the VIN, a fourth component within the multimedia (audio) service logic may recover a corresponding audio clip along with metadata pertaining to that audio clip. Audio clips and their corresponding metadata, referred to as "feature-audio objects," are provided to playlist/configuration generation logic. The playlist/configuration generation logic (sometimes referred to as a "playlist controller") selects and orders references to a subset of the audio clips (from the feature-audio objects) that form part of a presentation playlist. The presentation playlist may be customized in accordance with certain presentation adjustment factors, including static factors (e.g., dealer location, vehicle category, etc.) and/or dynamic factors (e.g., viewer profiles—profiles that are used to classify certain types of viewers requesting the presentation playlist). Such customization may be accomplished by intelligently selecting and ordering references to multimedia elements (e.g., audio clips, displayable images, etc.) placed within a presentation playlist based on one or more presentation adjustment factors. Hence, the selection and ordering of the multimedia elements is based on those multimedia elements that are most likely germane to the viewer, where the collective duration of the selected multimedia elements does not exceed a prescribed duration of the vehicle presentation.

According to one embodiment of the disclosure, the playlist/configuration generation logic of the content delivery system is configured to generate and subsequently store multiple customized presentation playlists for a selected vehicle (identified by a unique VIN) based, at least in part, on both the particular features on the selected vehicle and certain "static" presentation adjustment factors such as (1) the vehicle category (e.g., luxury, SUV, compact, etc.) that is pre-assigned to the VIN and/or (2) the geographic location of the dealer. Additionally, or in the alternative, the playlist/configuration generation logic may consider "dynamic" presentation adjustment factors (e.g., the prescribed viewer profiles) along with the static presentation adjustment factors and particular features on the selected vehicle when generating the multiple customized presentation playlists, or the playlist/configuration generation logic may consider the dynamic presentation adjustment factors along with the particular features on the selected vehicle to generate additional customized presentation playlists for the selected vehicle. As a result, for a particular vehicle (VIN), the playlist/configuration generation logic may generate a default presentation playlist along with one or more "customized" presentation playlists to account for each static presentation adjustment factor, each dynamic presentation adjustment factor, and/or any combination of static factors and/or dynamic factors.

Stated differently, the playlist/configuration generation logic may be configured to utilize metadata (e.g., static and/or dynamic presentation adjustment factors) in the selection and ordering of links directed to audio clips when generating an audio playlist that controls playback of audio clips for a multimedia vehicle presentation. Based on the selection and ordering of the audio clips, the playlist/configuration generation logic further generates an image playlist by selecting and ordering links to images that illustrate features (e.g., physical vehicle features, characteristics, awards, accolades, etc.) of the vehicle described in a corresponding audio clip. The combination of the audio playlist and the image playlist partially form the presentation playlist.

Besides handling the generation of presentation playlists and player configurations, the content delivery system is further configured with retrieval logic that services a request for a presentation playlist directed to a specific vehicle (VIN). The retrieval logic is configured to retrieve and return a viewer-customized presentation playlist for the specific vehicle, including any distinct features installed on that vehicle, along with a player configuration. The retrieval logic includes playlist retrieval logic, configuration retrieval logic, and/or viewer activity monitoring logic. The viewer activity monitoring logic may be deployed as part of the playlist retrieval logic or may be deployed separately from the playlist retrieval logic and communicatively coupled thereto.

Herein, the playlist retrieval logic may select a presentation playlist from a plurality (set) of presentation playlists for the specific vehicle (VIN) based, at least in part, on metadata within a vehicle presentation request message issued by a presentation player loaded in a network device. In particular, an incoming vehicle presentation request message for accessing a presentation playlist formed by the content delivery system may include an identifier of the specific vehicle (VIN), dealer information, and/or an identifier of a type of device issuing the vehicle presentation request message. The playlist retrieval logic may use the VIN to determine the vehicle category. Also, the playlist retrieval logic may use the dealer information to determine the current geographic location of the vehicle (dealer address) and may use a platform identifier (Platform_ID) to select a playlist that, when accessed by the presentation player, controls the gathering of images with a resolution consistent to the type of network device playing the vehicle presentation. As described above, knowledge of the vehicle category, geographic location of the vehicle and/or platform type may be used by the playlist retrieval logic in selecting what presentation playlist to retrieve that is generally customized for the viewer and/or her network device.

Additionally, or in the alternative, the playlist retrieval logic may select a presentation playlist this is specifically customized (individualized) for a particular viewer based, at least in part, on his or her assigned viewer profile. According to one embodiment of the disclosure, the content delivery system is configured to support a plurality of prescribed viewer profiles. The assigned viewer profiles may be determined from metadata captured by the viewer activity monitoring logic during a communication session between a network device controlled by the viewer and the content delivery system. In particular, the viewer activity monitoring logic may be configured to acquire dynamic metadata that pertains to the viewer and is available during the communication session. The acquired dynamic metadata may pertain to: (a) the geographic location of the viewer (obtained from the source IP address of the viewer's network device); (b) monitored viewer navigation activities during his/her current and previous communication sessions with the presentation player (e.g., selecting certain display elements of the player such as muting audio, focusing on a particular vehicle category, viewing safety reports, viewing vehicle features directed to outdoor activities, viewing time for each feature type, etc.), and/or (c) Internet browsing behaviors (obtained from cookies stored on the viewer's network device).

According to one embodiment, the viewer activity monitoring logic acquires metadata associated with the viewer and provides the acquired dynamic metadata along with at least a portion of the metadata within the vehicle presentation request message (e.g., Cookie_ID) to viewer analytics logic. Based on this metadata, the viewer analytics logic assigns the viewer (identified by the Cookie_ID) to a prescribed viewer profile and the correlation between the viewer (Cookie_ID) and the assigned viewer profile is maintained. It is contemplated that the acquired dynamic metadata may be maintained as well.

It is further contemplated that the viewer analytics logic may be used to change the assigned viewer profile or may be used to re-configure (or update) a prescribed viewer profile so that future presentation playlists may be better tailored to any viewer with that particular viewer profile. Re-configuring of the prescribed viewer profile may influence selection and ordering of multimedia elements within the presentation playlists. Thereafter, in response to a subsequent vehicle presentation request message from that viewer (Cookie_ID), the player retrieval logic may acquire the appropriate viewer profile that may be used in retrieving a particular presentation playlist.

Alternatively, it is contemplated that the playlist retrieval logic may include logic that, based on configuration rules, dynamically alters a retrieved presentation playlist. The metadata within the vehicle presentation request message and/or the acquired dynamic metadata that is available during the communication session (e.g., from the viewer activity monitoring logic) is provided to the playlist retrieval logic. The configuration rules are coded to alter ordering of multimedia elements based on the above-described metadata. The configuration rules may be modified on an aperiodic or a periodic basis, where these rules are downloaded from a selected source (e.g., cloud services, web server, etc.).

In summary, responsive to the vehicle presentation request message, the content delivery system delivers a presentation playlist for a particular vehicle (VIN) that would likely differ from a presentation playlist for the same vehicle but delivered to a different viewer. The content delivery system may be configured to generate a plurality of presentation playlists for the particular vehicle, each presentation playlist differing in selected multimedia elements or in the ordering of the selected multimedia elements (e.g., audio clips pertaining to the vehicle, images of different areas of the vehicle synchronized with the audio clips, displayable graphic user interface "GUI" menu representative of the presentation player, overlay images, overlay text, etc.). The selection and/or ordering of some or all of these multimedia elements may be based, at least in part, on one or more presentation adjustment factors considered during generation of the presentation playlist, including (i) a vehicle category (e.g., luxury, SUV, compact, etc.) assigned to the VIN, (ii) a location of the dealer, (iii) a computed location of the viewer, and/or (iv) an assigned viewer profile (e.g., navigation activities and/or browsing analytics to ascertain interests of the viewer) associated with an entity requesting the multimedia presentation for a particular vehicle. Likewise, the selection of the particular player configuration may be ascertained from an analysis of metadata within or accompanying the vehicle presentation request message.

I. Terminology

In the following description, certain terminology is used to describe aspects of the invention. For example, the terms "logic" and "component" may be representative of hardware, firmware, software, or any combination thereof that is configured to perform one or more functions. As hardware, logic (or component) may correspond to circuitry (or a collection of circuitry) having data processing and/or storage functionality. Examples of such circuitry may include, but are not limited or restricted to a hardware processor (e.g., microprocessor with one or more processor cores, a digital signal processor, a programmable gate array, a microcontroller, an application specific integrated circuit "ASIC", etc.), a semiconductor memory, or combinatorial elements. Such circuitry may be deployed as part of a network device.

Alternatively, the logic (or component) may correspond to software, such as executable code in the form of an executable application, an Application Programming Interface (API), a subroutine, a function, a procedure, an applet, a servlet, a routine, source code, object code, a shared library/dynamic load library, or one or more instructions. The software, when executed, performs certain functionality. The software may be stored in any type of a suitable non-transitory storage medium, or transitory storage medium (e.g., electrical, optical, acoustical or other form of propagated signals). Examples of non-transitory storage medium may include, but are not limited or restricted to (i) a programmable circuit; (ii) non-persistent storage including volatile semiconductor memory (e.g., any type of random access memory "RAM"); or (iii) persistent storage such as non-volatile semiconductor memory (e.g., read-only memory "ROM", power-backed RAM, flash memory, phase-change memory, etc.), a solid-state drive, hard disk drive, an optical disc drive, or a portable memory device. As firmware, the executable code may be stored in persistent storage.

Similarly, a "subsystem" includes a collection of logic that is configured to collectively perform one or more functions, such as the generation of content such as presentation playlists or player configurations, the retrieval of content such as a presentation playlist or a player configuration for example. The subsystem may be deployed as part of a network device or as a network device.

The term "network device" should be construed as electronics with data processing capability and/or a capability of connecting to any type of network, such as a public network (e.g., Internet), a private network (e.g., a wireless data telecommunication network, a local area network "LAN", etc.), or a combination of networks. Examples of a network device may include, but are not limited or restricted to, the following: a server; a router; a mainframe; consumer electronics (e.g., a laptop, a smartphone, a tablet, a desktop computer, a netbook, etc.); or the like.

A "data store" should be construed as one or more storage areas within persistent storage that is part of the non-transitory storage medium. Herein, persistent storage may be provided by a single persistent storage device or may be provided by a plurality of persistent storage devices.

A "dealer" may be generally defined as an entity having possession of the vehicle or any other entity involved in the marketing and/or conveyance (sale, lease, rental, consignment, etc.) of the vehicle. Examples of entities involved in the marketing and/or conveyance of the vehicle may include an OEM and any third-party provider.

In certain instances, the terms "compare" or "comparison" generally mean determining if a match (e.g., a certain level of correlation) is achieved between two items of information. In most cases, the match constitutes a comparison of identical items, albeit there are cases in which the match may feature a lesser level of correlation.

The term "interconnect" may be construed as a physical or logical communication path between two or more network devices. For instance, the communication path may include wired and/or wireless transmission mediums. Examples of wired and/or wireless transmission mediums may include electrical wiring, optical fiber, cable, bus trace, a radio unit that supports radio frequency (RF) signaling, or any other wired/wireless signal transfer mechanism.

A "message" generally refers to information transmitted as one or more electrical signals that collectively include electrically storable data in a prescribed format. Each message may be in the form of one or more packets, frames, or any other series of bytes or bits having the prescribed format. Examples of a prescribed format may include messages in accordance with any type of Hypertext Transfer Protocol based transmissions (HTTP; HTTPS), file transfer protocol (FTP), or the like.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

II. General Architecture

Referring to FIG. 1, an exemplary block diagram of an automated, content delivery system 110 communicatively coupled to a network 100 is described herein. Herein, the network 100 may be a single network (e.g., public network) or a collection of networks, such as a public network and/or a private network (e.g., an organization or enterprise network) for example. The network 100 enables one or more network devices $115_1$-$115_N$ (N≥1) to communicate with the content delivery system 110 via interconnects $118_1$-$118_N$. According to this embodiment, as shown, the content delivery system 110 may be implemented as logic operating in cooperation and deployed within a plurality of network devices, which are represented as a content retrieval subsystem 120, a content generation subsystem 125, and a storage subsystem 130. Of course, it is contemplated that the content delivery system 110 may be implemented as a single network device.

The content retrieval subsystem 120 operates in combination with the content generation subsystem 125 and the storage subsystem 130. As shown, the content retrieval subsystem 120 may include retrieval logic 160 and viewer analytics logic 165. The retrieval logic 160 includes playlist retrieval logic 161, configuration retrieval logic 162 and viewer activity monitoring logic 163. The viewer activity monitoring logic 163 may be communicatively coupled to the viewer analytics logic 165 and/or playlist retrieval logic 161, as shown.

The content generation subsystem 125 includes a playlist/configuration generation logic 170, multimedia service logic $175_1$-$175_M$ (e.g., M≥1, M=3) and control logic 180. The playlist/configuration generation logic 170 (sometimes referred to as a "playlist controller") is communicatively coupled to the multimedia service logic $175_1$-$175_M$ and control logic 180.

Lastly, the storage subsystem 130 includes a first data store 185 to store presentation playlists and/or player configurations associated with multiple vehicle presentations. The storage subsystem 130 may further include a second data store 190 that stores viewer profiles, where each viewer profile may be associated with a viewer (via his or her network device $115_1$, . . . , or $115_N$) that initiated a prior vehicle presentation request message to the content delivery system. Response to a vehicle presentation request message 142, the playlist retrieval logic 161 may access a viewer profile assigned to the viewer (via network device $115_1$) that initiated the request message 142, provided this vehicle presentation request message 142 is not the first vehicle presentation request message initiated by the viewer. The playlist retrieval logic 161 may consider the assigned viewer profile (and information within the assigned viewer profile such as activities conducted on previous access(es), features viewed for a particular vehicle, or the like) in selecting a presentation playlist from a plurality of presentation playlists associated with a particular VIN identified in the vehicle presentation request message 142.

Of course, each category of prescribed viewer profiles (e.g., outdoor enthusiast, stay-home parent, sporting enthusiast, etc.) may be relied upon by the playlist/configuration generation logic 170 to generate a plurality of different presentation playlists with multimedia elements selected and ordered to highlight features that may be more interesting to the viewer than other features. Hence, a presentation playlist associated with a first viewer profile category (e.g., sporting enthusiast, etc.) may feature multimedia elements (e.g., information to reference audio clips along with corresponding displayable images or other information) that are different from the multimedia elements of a second viewer profile category (e.g., stay-home parent, etc.)

Furthermore, as shown in FIG. 1, the storage subsystem 130 further includes a third data store 195 to store content used in the creation of the presentation playlist, including program/dealer information, dealer-specific VIN templates, scripts, vehicle objects, master feature objects, audio objects, and/or vehicle catalog information, as described below and identified in FIG. 2C. It is contemplated that the data stores 185, 190 and/or 195 may be part of the same physical memory (e.g., partitioned memory, assigned memory address ranges, etc.), or at least one of the data stores 185, 190 and/or 195 may be associated with a different physical memory component than another one of the data stores 185, 190 and/or 195.

As further shown in FIG. 1, in response to a predetermined event (e.g., viewer selection of a displayable image on a webpage that prompts playback of a vehicle presentation; automatic playback of a vehicle presentation based on an access to a particular webpage, etc.), the network device $115_1$ is redirected to a web server 135 to download a presentation player widget 140 if the widget 140 is not currently loaded on the network device $115_1$. When loaded and executed, the presentation player widget 140 enables the network device $115_1$ to access the content retrieval subsystem 120 to retrieve a presentation playlist and a corresponding player configuration. The presentation player widget 140 relies on the presentation playlist to control (i) the fetching of images and audio from cloud services 105 and (ii) the coordinated playback of multimedia elements, including the fetched images and audio, as part of the vehicle presentation.

Figure 4:
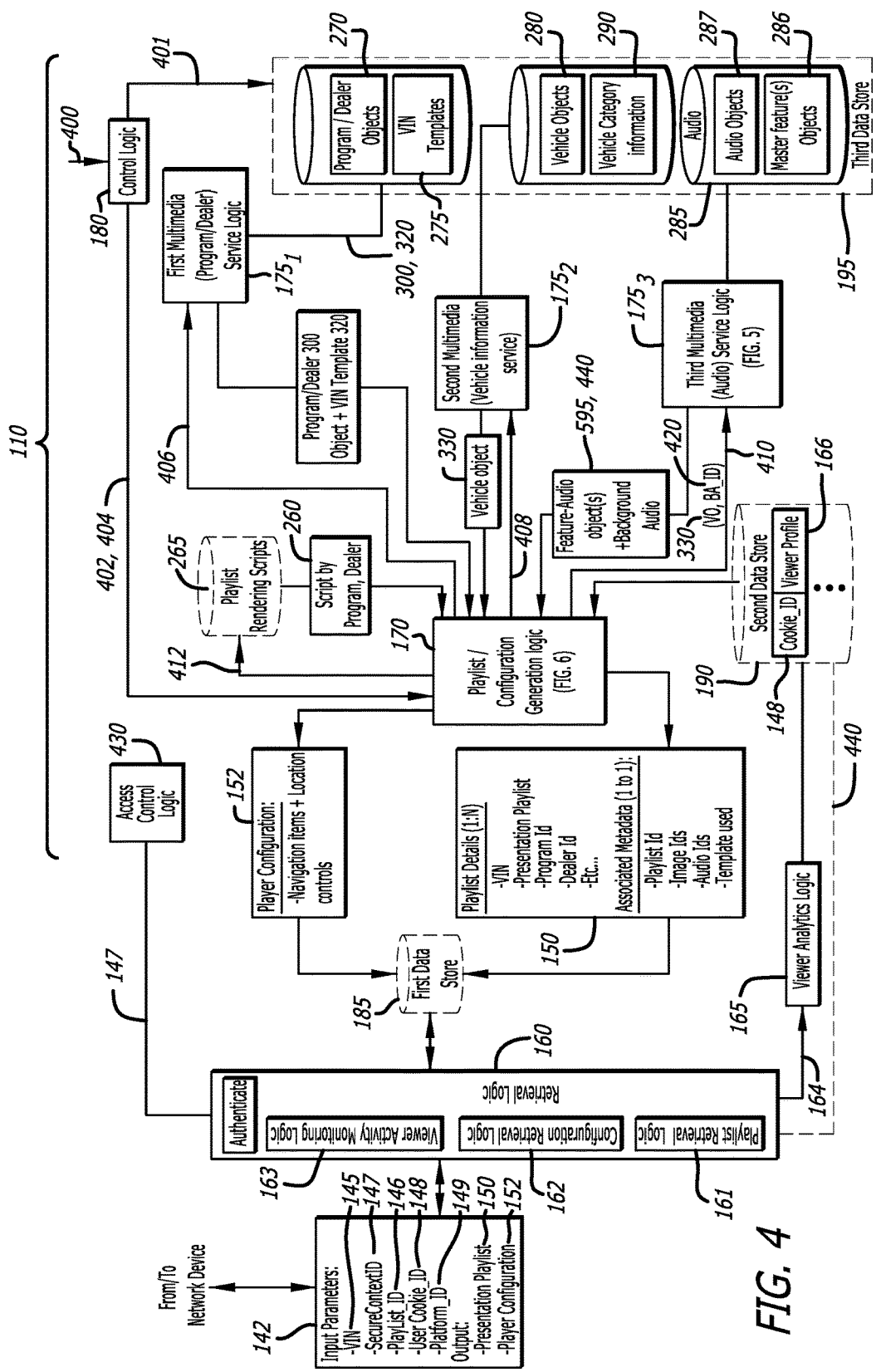
FIG. 4 is an illustrated embodiment of a process for generating a presentation playlist.

More specifically, according to one embodiment of the disclosure as shown in FIG. 1 and FIG. 4, the presentation player widget 140, residing on the network device $115_1$, is adapted to issue the vehicle presentation request message 142 to the content delivery system 110 via network 100. According to one embodiment of the disclosure, the vehicle presentation request message 142 identifies a specific vehicle by its VIN (e.g., GET(VIN, . . . ) message) and requests return of a presentation playlist 150 associated with the VIN and a player configuration 152 associated with the dealer. The presentation playlist 150, when processed by the presentation player widget 140, controls coordination of the streaming of images and the playback of corresponding audio clips for a requested vehicle presentation. The player configuration 152, when processed by the presentation player widget 140, controls the configuration of the navigation menu (including viewer controls of the vehicle presentation) along with text or image overlay control and placement of certain information that is agnostic to the vehicle (e.g., image animations, logos, etc.).

A. Content Retrieval Subsystem

As illustrated in both FIG. 1 and FIG. 4, the content retrieval subsystem 120 operates as the communication interface for the content delivery system 110. The content retrieval subsystem 120 includes the retrieval logic 160 and/or the viewer analytics logic 165. The retrieval logic 160 includes playlist retrieval logic 161, configuration retrieval logic 162 and viewer activity monitoring logic 163.

Upon receipt of the vehicle presentation request message 142, the retrieval logic 160 within the content retrieval subsystem 120 extracts information from the vehicle presentation request message 142, where the information may be used for the selection of a stored presentation playlist and a player configuration. The vehicle presentation request message 142 includes metadata, including a VIN 145, an optional playlist identifier (Playlist_ID) 146, a dealer/program identifier (SecureContextID) 147, user cookie identifier (Cookie_ID) 148, and/or platform (device) type identifier (Platform_ID) 149.

Upon receipt of the vehicle presentation request message 142, the retrieval logic 160 conducts an initial authentication of that message 142, which may include passing the SecureContextID 147 to access control logic 430 (see FIG. 4) within the content delivery system 110. Information within the SecureContextID 147 may be passed to the access control logic 430 to confirm that the incoming message 142 is from a subscriber of these presentation playlist delivery services. Upon authentication, the access control logic 430 signals the retrieval logic 160, including the playlist retrieval logic 161, the configuration retrieval logic 162 and the viewer activity monitoring logic 163, to continue operations as described below.

Herein, the VIN 145 identifies the vehicle to be portrayed by the requested vehicle presentation. Herein, the playlist retrieval logic 161 may utilize the VIN 145 to at least differentiate a plurality of presentation playlists associated with the VIN 145 from presentation playlists maintained for thousands or even millions of other vehicles. Also, the playlist retrieval logic 161 may use the VIN 145 to determine the category of the vehicle. The category may be used as a factor in the selection of the presentation playlist 150, where the presentation playlist 150 would be organized with audio clips along with corresponding images, overlays, logos, or the like that focus on popular features for this type of category.

For instance, a presentation playlist associated with a vehicle that falls within a "compact" category may prioritize multimedia elements directed to fuel economy, safety, trunk capacity and crash safety, namely multimedia elements that may be important for a viewer looking to purchase a compact vehicle. In contrast, a presentation playlist associated with a vehicle that falls within the sports utility vehicle "SUV" category may prioritize multimedia elements differently than other categories, such as a presentation playlist directed to passenger capacity, all-wheel drive, navigation controls, and crash safety.

As described above, the playlist retrieval logic 161 is responsible for retrieving the presentation playlist 150 from the first data store 185 within the storage subsystem 130. Where the received vehicle presentation request message 142 includes the Playlist_ID 146, the playlist retrieval logic 161 retrieves a presentation playlist uniquely identified by the Playlist_ID 146 (e.g., presentation playlist 150). However, for embodiments in which the received vehicle presentation request message 142 fails to include the Playlist_ID 146, the playlist retrieval logic 161 may consider metadata acquired during a communication session with the network device $115_1$, including metadata associated with the received vehicle presentation request message 142, to select the presentation playlist 150.

Referring still to FIGS. 1 and 4, the SecureContextID 147 includes information for authenticating requested usage of presentation playlist delivery services provided by the content delivery system 110. The information within the SecureContextID 147 used for authentication may include (i) information that identifies a dealer associated with the vehicle (Dealer_ID) and/or (ii) information that identifies the subscriber (e.g., third-party such as a portal hosting the dealer inventory, manufacturer, or even specific dealer) and the subscription level (Sub_Level) for the subscriber. It is contemplated that the Dealer_ID may include a one-way hash result of the dealer name, assigned user name, or any other value to identify the dealer. Also, the subscriber's subscription level may convey the quality of service (QoS), download speed, chosen format for delivery of the presentation playlist 150 and the player configuration 152. The SecureContextID 147 may be further used by configuration retrieval logic 162 for retrieval of the player configuration 152 that pertains to the dealer.

The Cookie_ID 148 includes a cookie assigned to the network device $115_1$ requesting the presentation playlist 150 for the presentation player 140. The Cookie_ID 148 may have been previously issued by the content retrieval subsystem 120 during a prior access of the content delivery system 110 or has been newly issued in response to the current access to the content delivery system 110. The Cookie_ID 148 may be made available to the playlist retrieval logic 161 for use in accessing a viewer profile associated with the source of the vehicle presentation request message 142, as described below.

The Platform_ID 149 includes information directed to a preferred format of presentation playlist 150 and/or the player configuration 152. Herein, the playlist retrieval logic 161 may rely on the Platform_ID 149 as a factor in the selection of the presentation playlist 150. Additionally, the configuration retrieval logic 162 may rely on the Platform_ID 149 to select a particular player configuration 152 that supports the identified platform (device) type.

In particular, multiple presentation playlists and player configurations for the same vehicle may be maintained for operation on different platforms, such as network devices that support different display sizes and resolutions. An as illustrative example, where the Platform_ID 149 identifies the network device $115_1$ as the source of the vehicle presentation request message 142 and is operating as a mobile device (e.g., a smart phone), the playlist retrieval logic 161 may consider only presentation playlists associated with the VIN 145 that include image links to images having at most a first resolution (e.g., 1280×720 pixel images, etc.). In contrast, where the Platform_ID 149 identifies that the vehicle presentation request message 142 is issued from the network device $115_1$ operating as a laptop computer, the playlist retrieval logic 161 may consider presentation playlists associated with the VIN 145 that include image links to images with at least a second resolution that is greater than the first resolution (e.g., 1920×1080 pixel images, etc.). Similarly, the Platform_ID 149 may be considered by the configuration retrieval logic 162, as navigation controls for the presentation player may vary depending on the platform (device) type.

Additionally, or in the alternative, the playlist retrieval logic 161 may select a presentation playlist this is specifically customized (individualized) for a particular viewer based, at least in part, on his or her viewer profile, which may be determined from metadata captured by the viewer activity monitoring logic 163 during a communication session between the network device $115_1$ controlled by the viewer and the content retrieval subsystem 120. In particular, the viewer activity monitoring logic 163 may be configured to acquire dynamic metadata that pertains to the viewer and is available during the communication session. The acquired dynamic metadata may include, but is not limited or restricted to the following: (a) the geographic location of the viewer (obtained from the source IP address of the viewer's network device); (b) viewer navigation activities during his/her communication session with the presentation player (e.g., selecting certain display elements of the player such as muting audio, focusing on a particular vehicle category, viewing safety reports, viewing vehicle features directed to outdoor activities, viewing time for each feature type, etc.), and/or (c) Internet browsing behaviors (obtained from cookies stored on the viewer's network device).

According to one embodiment, as shown in FIG. 1 and FIG. 4, the viewer activity monitoring logic 163 acquires metadata associated with the viewer (not shown) and provides a collection of the metadata 164 to viewer analytics logic 165. This metadata 164 may include the acquired dynamic metadata along with at least a portion of the metadata (e.g., Cookie_ID 148) within the vehicle presentation request message 142, to viewer analytics logic 165. Based on the collection of metadata 164, the viewer analytics logic 165 assigns the viewer (identified by the Cookie_ID 148) to a prescribed viewer profile and the correlation between the viewer (Cookie_ID 148) and the assigned viewer profile 166 is maintained. The assigned viewer profile 166 may include at least a portion of the acquired dynamic metadata.

It is contemplated that the acquired dynamic metadata may be further used to change the assigned viewer profile 166 or may be used to re-configure (or update) a viewer profile category as to what features may be more interesting to any viewer with that profile (which may influence selection and ordering of multimedia elements within the presentation playlists). Where the vehicle presentation request message 142 is not the first vehicle presentation request message from the viewer identified by Cookie_ID 148, the player retrieval logic 161 may now acquire the viewer profile 166 from the second data store 190 for use in selecting the presentation playlist 150 as represented by communication path 167.

Alternatively, it is contemplated that the playlist retrieval logic 161 may include logic that, based on configuration rules, dynamically alters, in real-time, the presentation playlist 150 based on the metadata within the vehicle presentation request message 142 and/or the acquired dynamic metadata (not shown) that is available during the communication session. The acquired dynamic metadata may be provided to the playlist retrieval logic 161 from the viewer activity monitoring logic 163.

The viewer analytics logic 165 may be provided to acquire and/or analyze metadata associated with the viewer from the viewer activity monitoring logic 163, where such analysis may be used to associate the viewer (identified by the Cookie_ID 148) to a prescribed viewer profile supported by the content delivery system 110. For example, based on the acquired dynamic metadata, the Cookie_ID 148 may be associated with an individual viewer profile (Cookie_ID 148→viewer profile #1). Alternatively, it is contemplated that the Cookie_ID 148 may be associated with a group of viewer profiles (Cookie_ID 148→viewer profiles #1&2). Hence, using the Cookie_ID 148 as a look-up parameter, the associated viewer profile may be obtained for use in the selection of the presentation playlist 150, where the presentation playlist 150 is requested after issuance of the Cookie_ID 148 and after assignment of the viewer profile.

B. Content Generation Subsystem

Referring to FIG. 1, the content generation subsystem 125 is also communicatively coupled to the storage subsystem 130 to gain access to stored content used to generate presentation playlists and player configurations. The generated presentation playlists and player configurations are stored in the first data store 185, which may be storage area within the storage subsystem 130 or storage area within a different storage subsystem.

Herein, the playlist/configuration generation logic 170 is responsible for generating presentation playlists for storage within the first data store 185 in response to detection of a triggering event by the control logic 180. More specifically, as shown in both FIG. 1 and FIG. 4, the control logic 180 is configured to monitor for a triggering event 400, such as any attempt to change certain content stored in the third data store 195. This attempt may include an attempt to add or modify content within a stored vehicle object or a stored audio object. The attempt may further include an attempt to modify dealer information stored in the third data store 195. It is contemplated that any of these attempts may be initiated through a request message to modify content (i.e., a content modification request) initiated by the dealer or a third party authorized by the dealer. Additionally, the control logic 180 is configured to monitor for any additions (content addition request) or deletions (content deletion request) of vehicle objects, audio objects or dealer information into the third data store 195.

In general, according to one embodiment of the disclosure that is shown in FIGS. 1 and 4, the control logic 180 is configured to detect an attempt to modify, add or delete content within the third data store 195. Upon detecting such an attempt, the control logic 180 passes information associated with the attempt to the playlist/configuration generation logic 170. The information may include an identifier for a source responsible for the modification of content within the third data store 195 (e.g., an identifier of the dealer "Dealer_ID" 404) and the VIN 402 associated with the vehicle to which content is being modified, added or deleted. The control logic 180 provides the VIN 402 and the Dealer_ID 404 to the playlist/configuration generation logic 170.

As described below in greater detail, responsive to receipt of the VIN 402 and the Dealer_ID 404 from the control logic 180, the playlist/configuration generation logic 170 provides the Dealer_ID 404 to a first multimedia (program/dealer) service logic $175_1$. Thereafter, the first multimedia service logic $175_1$ recovers a program/dealer object 300 associated with the Dealer_ID 404, as described below. Additionally, the first multimedia service logic $175_1$ may use the Dealer_ID 404 to determine if a dealer-specific VIN template 320 has been stored for the dealer. A "VIN template" may include information that is utilized by the script 260 running in the playlist/configuration generation logic 170 to enable or disable the presentation of certain features of the vehicle as well as provide information directed to the configuration of the navigation menu associated with the player configuration. In general terms, the VIN template 320 provides additional dealer-specific rules that are utilized by the script 260 in the formation of the presentation playlist 150 and player configuration 152.

Additionally, in response to receiving the Dealer_ID 404 and information within the program/dealer object (e.g., program information 315 of FIG. 3A), the playlist/configuration generation logic 170 obtains a script 260 for use in generating one or more presentation playlists and player configuration associated with the VIN 145. The script 260, along with the VIN template, if available, provides at least some of the rules relied upon by the playlist/configuration generation logic 170 in the generation of the presentation playlist 150 and the player configuration 152.

More specifically, the playlist/configuration generation logic 170 may utilize the Dealer_ID 404 to conduct a lookup of the third data store 195 to determine whether a dealer-specific script exists for the specific dealer (Dealer_ID 404). If no dealer-specific script is stored, the playlist/configuration generation logic 170 fetches a default script from the third data store 195. The default script, when processed by the playlist/configuration generation logic 170, may alter selection and ordering of audio clips based on presentation adjustment factors; however, the default script would not include certain conditions (e.g., required additions and/or exclusions) in the formation of the presentation playlist 150 that is specific for that particular dealer (e.g., no images of CarFax™ links to be placed into the presentation, use a certain background color for vehicle presentations, etc.).

The playlist/configuration generation logic 170 may further provide the extracted VIN to a second multimedia (vehicle information) service logic 175₂. The second multimedia service logic 175₂ recovers a vehicle object corresponding to the VIN. After recovery of the vehicle object, the third multimedia service logic 175₃ utilizes the vehicle object to recover audio clips that are directed to features of the vehicle, as described below and illustrated in FIG. 5.

C. Physical Architectures of the Content Delivery System

Figure 2A:
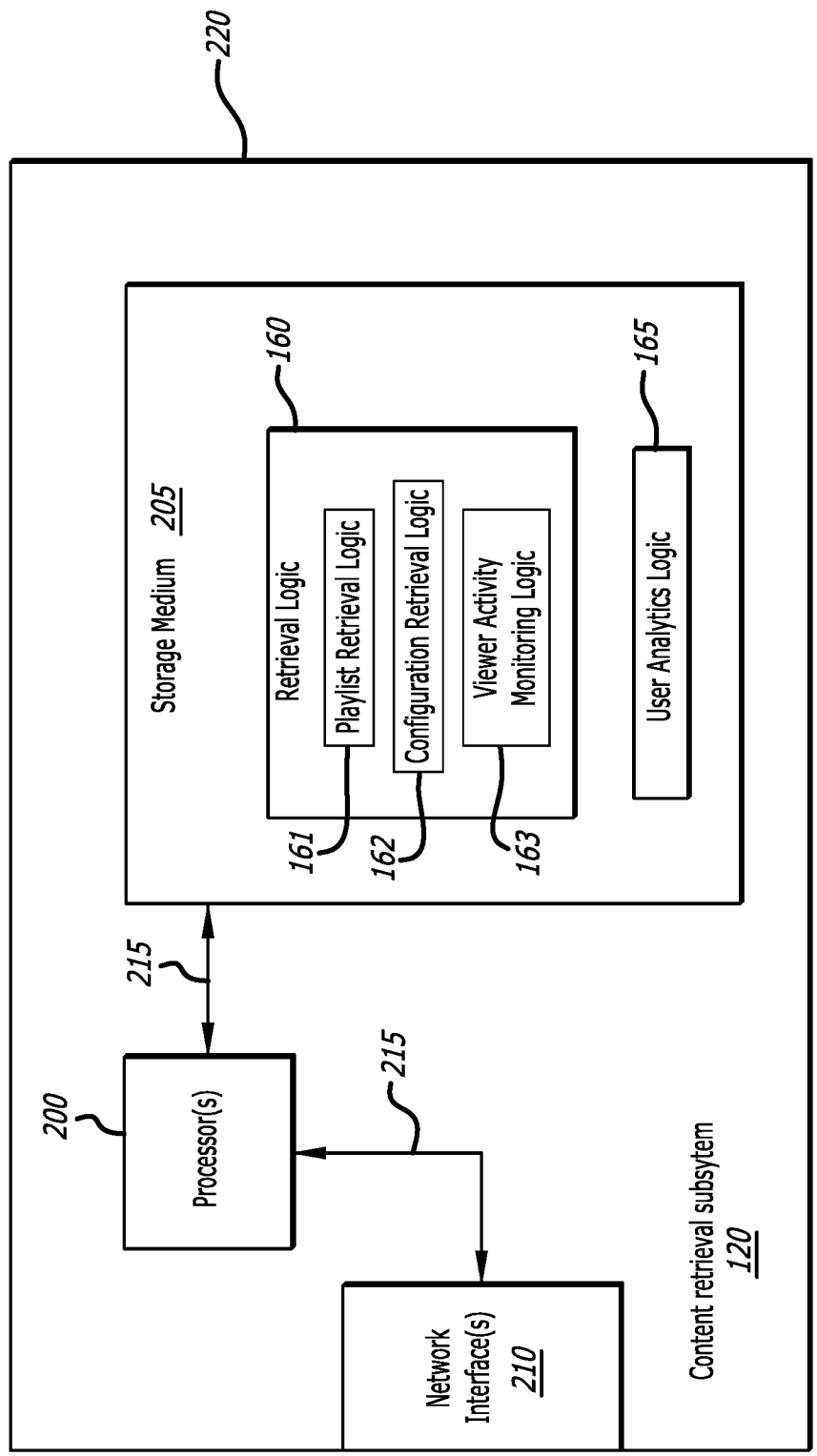
FIG. 2A is an illustrative embodiment of the physical architecture of the content retrieval subsystem of FIG. 1.

Referring now to FIG. 2A, an illustrative embodiment of the physical architecture of the content retrieval subsystem 120 is shown. Herein, the content retrieval subsystem 120 includes one or more hardware processors (referred to as "processor(s)") 200, a non-transitory storage medium 205, and one or more network interfaces (referred to as "network interface(s)") 210. These components are in communication via interconnects 215 and are at least partially encased in a housing 220, which is made entirely or partially of a rigid material (e.g., hardened plastic, metal, glass, composite, or any combination thereof) that protects these components from environmental conditions.

The processor(s) 200 is a multi-purpose, programmable component that is configured to execute logic maintained within the non-transitory storage medium 205 that is operating as a data store. As described above, the logic may include, but is not limited or restricted to the (i) the retrieval logic 160 that may include the playlist retrieval logic 161, the configuration retrieval logic 162 or the viewer activity monitoring logic 163, and/or (ii) the viewer analytics logic 165. One example of a processor may include an Intel® x86 central processing unit (CPU) with an instruction set architecture. Alternatively, processor(s) 200 may include another type of CPU, a digital signal processor (DSP), an Application Specific Integrated Circuit (ASIC), a field-programmable gate array (FPGA), or another hardware component with data processing capability.

As shown, the processor(s) 200 is configured to execute the playlist retrieval logic 161 and/or the viewer activity monitoring logic 163, and upon execution, the playlist retrieval logic 161 analyzes metadata associated with an incoming vehicle presentation request message received via the network interface(s) 210. According to one embodiment, in response to analysis of the metadata, the playlist retrieval logic 161 may automatically select a first presentation playlist (e.g., presentation playlist 150 of FIG. 1) from a plurality of presentation playlists concerning the same VIN, where the first presentation playlist would be more tailored to the viewer.

For example, the plurality of presentation playlists may include a default presentation playlist along with one or more "customized" presentation playlists. A first "customized" presentation playlist may be more directed toward cold climate locations (e.g., primary focus on heated seats, remote start, remote key entry, heating system, etc.). Given that the Dealer_ID from the SecureContextID metadata within the vehicle presentation request message identifies the car is located in Alaska, the playlist retrieval logic 161 may be more adapted to select the first presentation playlist directed to cold climate locations (i.e., playlist focused on dealer/vehicle location).

According to another embodiment, the playlist retrieval logic 161 may use metadata from the incoming vehicle presentation request message along with metadata from the assigned viewer profile. For example, the plurality of presentation playlists may include a default presentation playlist along with one or more "customized" presentation playlists. Given access to the Dealer_ID that identifies the car is located in Alaska, the playlist retrieval logic 161 may select for the first presentation playlist directed to cold climate locations. However, the playlist retrieval logic 161 may use the Cookie_ID to access the viewer profile, which may identify the viewer is profiled as a sports enthusiast. Hence, instead of the first presentation playlist, the playlist retrieval logic 161 may select a second presentation playlist that is directed to either (i) sporting enthusiasts or (ii) both sporting enthusiasts and cold climate locations (e.g., primary focus on 4×4 drive, fog lights, heating system, remote key entry, etc.). The selection and ordering of multimedia elements for the second presentation playlist may differ from the first presentation playlist.

According to yet another embodiment, the playlist retrieval logic 161 may use metadata from the incoming vehicle presentation request message and/or the assigned viewer profile to dynamically alter a presentation playlist in real-time to produce the presentation playlist 150 that is tailored to the viewer profile. For example, again, the plurality of presentation playlists may include a default presentation playlist and/or one or more "customized" presentation playlists. Herein, according to one embodiment of the disclosure, the playlist retrieval logic 161 may be configured to dynamic alter the ordering of the multimedia elements (e.g., image links and corresponding audio links, logos, etc.) within a retrieved presentation playlist in accordance with stored configuration rules (not shown). As a result, the playlist retrieval logic 161 may produce, in real-time, the customized presentation playlist 150 tailored for the particular viewer.

The processor(s) 200 is further configured to execute the viewer analytics logic 165, which is configured to analyze metadata from the vehicle presentation request message (not shown) and/or metadata associated with viewer navigation activities or Internet browsing behaviors from the viewer activity monitoring logic 163. Such analysis may produce results that associate the viewer to a particular profile or update a current viewer profile. The viewer profile may be subsequently used by the playlist retrieval logic 161 to select the presentation playlist 150 tailored to the viewer. Furthermore, the analysis may cause the viewer analytics logic 165 to adjust characteristics of a particular viewer profile category, which may cause alteration in the ordering or selection of multimedia elements (e.g., audio clips and any corresponding images, text or image overlays, etc.) in the generation of presentation playlists.

Figure 2B:
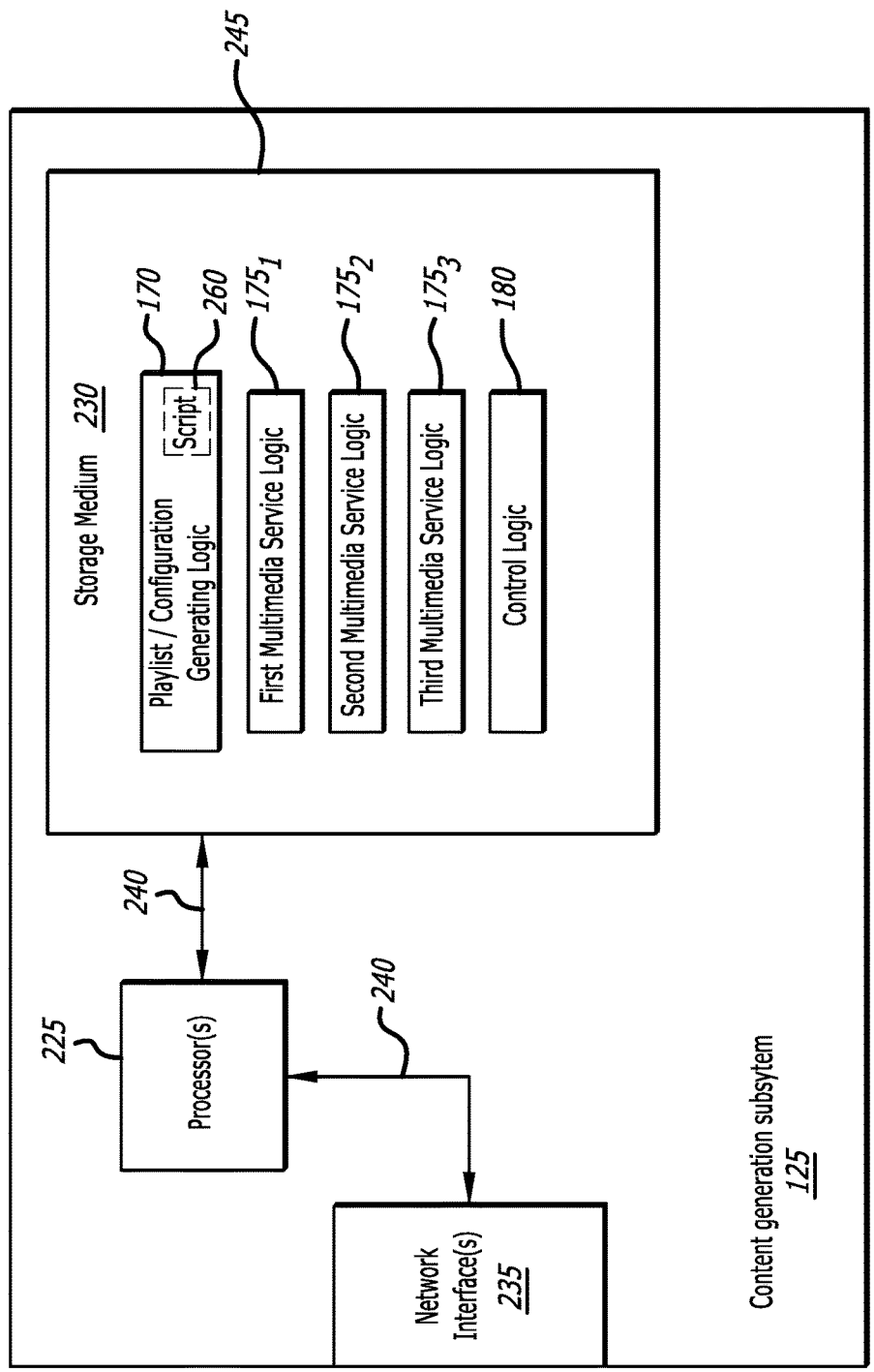
FIG. 2B is an illustrative embodiment of the physical architecture of the content generation subsystem of FIG. 1.

Referring now to FIG. 2B, an illustrative embodiment of the physical architecture of the content generation subsystem 125 is shown. Herein, the content generation subsystem 125 comprises one or more hardware processors (referred to as "processor(s)") 225, a non-transitory storage medium 230, and network interface(s) 235. These components are in communication via interconnects 240 and are at least partially encased in a housing 245, which may be similar to housing 220 of FIG. 2A.

The processor(s) 225 is configured to execute logic maintained within the non-transitory storage medium 230, which may include (i) the playlist/configuration generation logic 170, (ii) the multimedia service logic 175₁-175_M, and/or (iii) the control logic 180. As shown, the processor(s) 225 is configured to execute the playlist/configuration generation logic 170 that is configured to process a selected script 260 (retrieved from the storage subsystem 130 of FIG. 2C), which consumes the input data to produce the presentation playlist 150 and the player configuration 152, as described below in detail. The input data may include information extracted from program/dealer video objects 270, VIN templates 275, vehicle objects 280, audio data 285 including master feature objects 286 and audio objects 287, and/or vehicle catalog information 290 maintained within the storage subsystem 130 as illustrated in FIG. 2C. The storage subsystem 130 includes processor(s) 250, storage medium 251, network interface(s) 252 connected via interconnects 253, which are contained in housing 254.

Referring now to FIGS. 3A-3F, illustrative embodiments of the data structure associated with the contents of a program/dealer object 300 included as part of the program/dealer objects 270 in FIG. 2C is shown. Additionally, exemplary data structures of an exemplary VIN template 320 of the VIN templates 275 (FIG. 2C), an exemplary vehicle object 330 of the vehicle objects 280 (FIG. 2C), an exemplary master feature object 350 of the master feature objects 286 (FIG. 2C), an exemplary audio object 360 of the audio objects 287 (FIG. 2C), and an exemplary feature-audio object 370 of the feature-audio objects 288 (FIG. 2C) are shown. Content within these data objects is utilized by the playlist/configuration generation logic 170 within the content generation subsystem 125 of FIG. 2B in the automated formation of audio clips and the generation of presentation playlists and player configurations, as described herein.

Figure 3A:
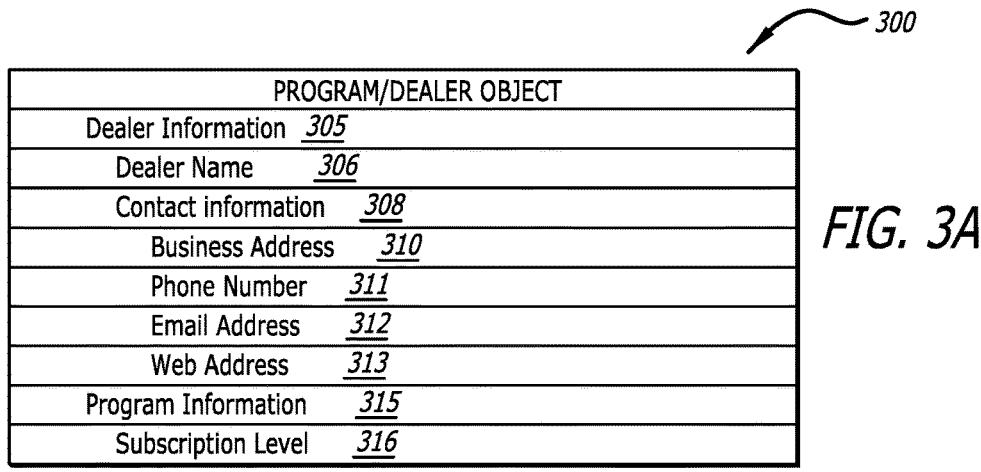
FIG. 3A is an illustrative embodiment of stored contents of a data structure associated with a program/dealer object of the program/dealer objects of FIG. 2C.

With respect to FIG. 3A, an illustrative embodiment of the stored contents of a data structure associated with the program/dealer object 300 is shown. Herein, the program/dealer object 300 includes dealer information 305 and program information 315. As shown, the dealer information 305 may include a dealer name 306 along with contact information 308 for the dealer. For example, the contact information 308 may include the business address 310, phone number 311, email address 312, and/or web address 313.

As the content delivery system 110 may be configured to provide access on a subscription basis, the program information 315 may be used to identify the subscription level 316, namely the specific program subscribed by the dealer. The type of program may be used by the first multimedia service logic 175₁ of FIG. 1 to assign a certain quality of service (QoS) for activities performed in response to vehicle presentation request messages directed to accessing presentation playlists and player configurations associated with the dealer's vehicles. Additionally, the type of program may be used by the first multimedia service logic 175₁ of FIG. 1 to determine what dealer information to provide to the playlist/configuration generation logic 170. For instance, a request originating from the CarsDirect® website on behalf of a dealer may be assigned a different program type or provide different dealer information (e.g., a different phone number) than a request originating from the dealer website.

Figure 3B:
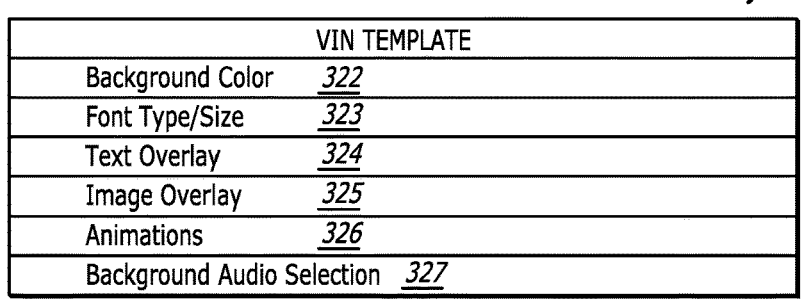
FIG. 3B is an illustrative embodiment of stored contents of a data structure associated with a VIN template of the VIN templates of FIG. 2C.

Referring now to FIG. 3B, an illustrative embodiment of the stored contents of a data structure associated with the VIN template 320 is shown. Herein, the VIN template 320 acts as a guideline as to what features of a vehicle, if any, are requested to be captured within or excluded from the presentation playlist 150 by the specific dealer responsible for the vehicle uniquely identified by an incoming VIN. Stated differently, the VIN template 320 enables and/or disables selected features of the vehicle from being considered by the playlist/configuration generation logic 170 when generating the presentation playlist 150. Also, the VIN template 320 defines a general layout and "theme" of vehicle presentations produced for that corresponding dealer, where the correlation between the VIN template 320 and dealer may be learned from the Secure ContentID 147 of FIG. 1.

For instance, the VIN template 320 may include information directed to the background color 322 or font type/size 323 to be utilized in the vehicle presentation produced by the presentation playlist 150. The VIN template 320 may further include information directed to the positioning of text overlays 324 or image overlays 325 as well as the information directed to what image animations 326, if any, are provided as part of the vehicle presentation. Also, the VIN template 320 further includes information that identifies customized background audio 327 to be used for vehicle presentations associated with this particular dealer. The background audio identifier may be represented as background audio identifier (BA_ID) as shown in FIG. 4.

Figure 3C:
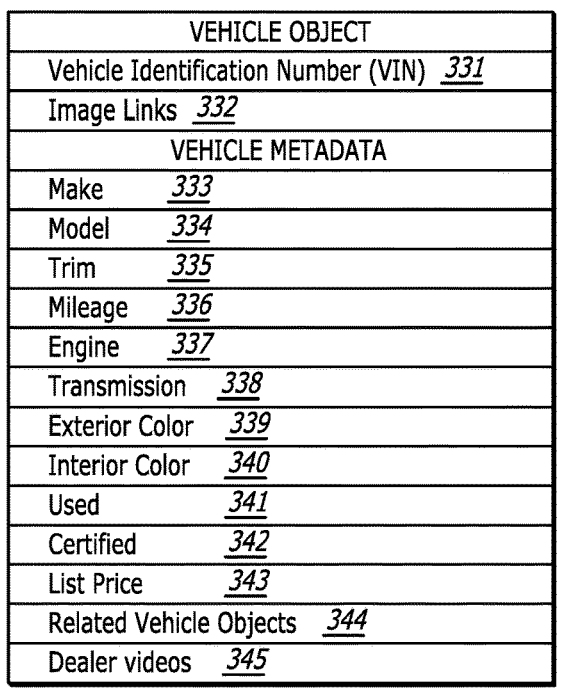
FIG. 3C is an illustrative embodiment of stored contents of a data structure associated with a vehicle object of the vehicle objects of FIG. 2C.

Referring to FIG. 3C, an illustrative embodiment of stored contents of a data structure associated with the vehicle object 330 is shown. Herein, the vehicle object 330 includes a VIN 331 that uniquely identifies the targeted vehicle for the vehicle presentation. Based on the VIN 331 received from the control logic 180, the playlist/configuration generation logic 170 of FIG. 1 retrieves the vehicle object 330 for use in the retrieval of one or more feature-audio objects as described in FIG. 5. As part of the vehicle object 330, links 332 to stored images associated with the vehicle identified by the VIN 331 are provided. Some or all of these image links 332 may be organized as part of the presentation playlist 150 so that the presentation player widget 140 fetches these images for display concurrently (e.g., at least partially overlapping in time) with playback of selected audio clips.

Besides the VIN 331 and image links 332, the vehicle object 330 may include metadata directed to the physical features associated with the vehicle (sometimes referred to as "vehicle metadata"). Examples of the vehicle metadata may include, but is not limited or restricted to the following:

| VEHICLE OBJECT | |
|---|---|
| Vehicle Identification Number (VIN) 331 | A unique identifier of the vehicle |
| Image link(s) 332 | One or more links (URLs) to images illustrative of the vehicle |

| VEHICLE METADATA | DESCRIPTION (FUNCTIONALITY) |
|---|---|
| Make 333 | Vehicle manufacturer |
| Model 334 | Brand of vehicle sold under a marque by the manufacturer |
| Trim 335 | A designation related to the level of features standard for that vehicle type |
| Mileage 336 | Current recorded mileage for the vehicle |
| Engine 337 | Engine type |
| Transmission 338 | Transmission type |
| Exterior Color 339 | Vehicle paint color |
| Interior Color 340 | Vehicle upholstery and carpeting color |
| Used 341 | Previously owner vehicle |
| Certified 342 | Dealer inspected vehicles typically with a longer warranty than used vehicles |
| List Price 343 | Current sale price |
| Related Vehicle Objects 344 | Unstructured text of features provided by the dealer |
| Dealer videos 345 | Added dealer videos of the particular vehicle |

Figure 3D:
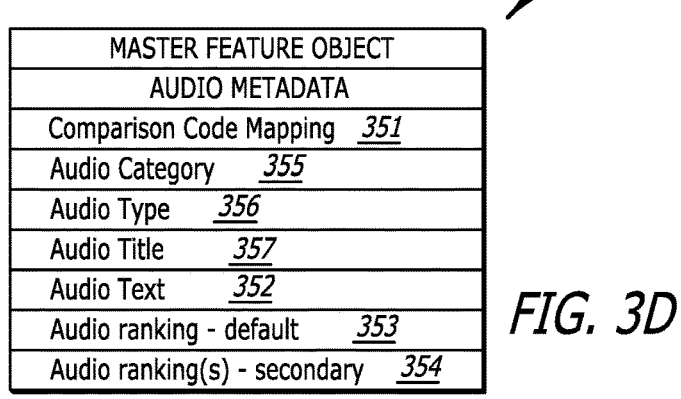
FIG. 3D is an illustrative embodiment of stored contents of a data structure associated with a master feature object of the master feature objects of FIG. 2C.
Figure 5:
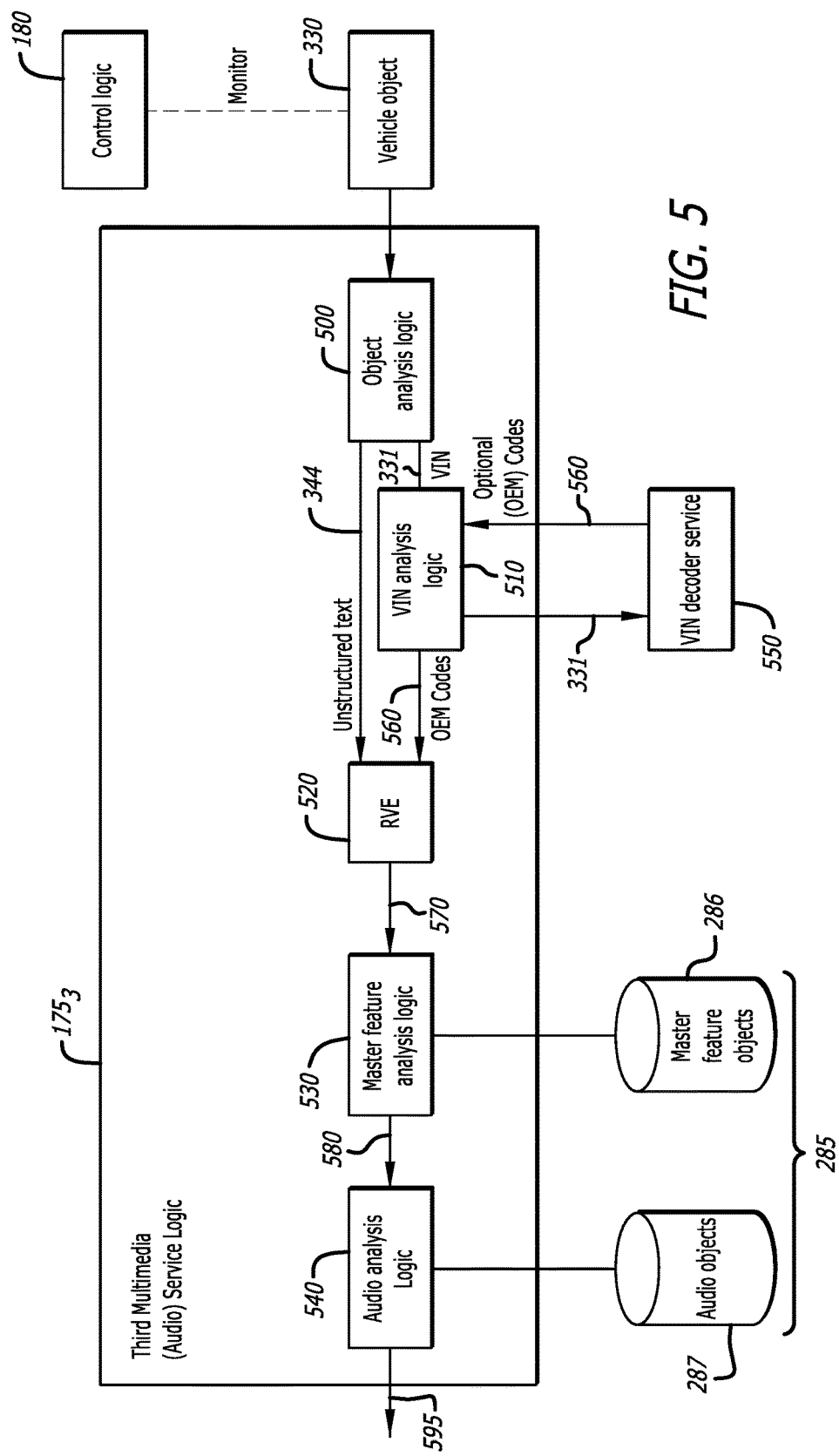
FIG. 5 is an illustrative embodiment of the flow for creation of one or more feature-audio objects by the third multimedia service logic of the content generation subsystem of FIG. 1 and FIG. 4.

Referring now to FIG. 3D, an illustrative embodiment of stored contents of the master feature object 350 is shown. Herein, the master feature object 350 includes an comparison code mapping 351, which identifies one or more comparison codes (and their particular values) that collectively correspond a vehicle feature represented by the master feature object 350. Hence, when comparison code mapping 351 matches the values associated with comparison codes, which are generated from (a) the translation of option codes received from build data using the VIN and/or (b) unstructured text 344 from the vehicle object 330 as illustrated in FIG. 5 and described below, the feature represented by audio text 352 is determined to be present on the vehicle identified by the VIN.

According to one embodiment of the disclosure, the audio text 352 may include a text description that corresponds to an introduction for the vehicle presentation, a conclusion for the vehicle presentation, or a general advertisement to highlight awards, accolades, or other supportive statements concerning the vehicle. Alternatively, the audio text 352 may be directed toward a text description of another type of feature, such as a text description directed toward a physical feature of the vehicle (e.g., 8-way adjustable leather heated seats with lumbar support; twelve Bose® speaker system; etc.) or a characteristic of the vehicle (e.g., towing capacity, cargo capacity, gas mileage, etc.) for example.

The master feature object 350 further includes metadata associated with the ordering of playback of the audio within the presentation playlist, namely a default audio ranking 353 and one or more secondary audio rankings 354. In some situations, it may be useful to simply provide a presentation playlist which controls playback of a vehicle presentation that highlights a universal set of vehicle features highly sought by consumers at large, independent of the viewer, the location of the vehicle, or the vehicle type. As a result, the playlist/configuration generation logic selects and orders the audio clips referenced in the presentation playlist in accordance with the default audio ranking 353. However, in other situations, the playlist/player generation logic 170 may select and order the audio clips in accordance with one or more secondary audio rankings 354, which reference different audio clips and/or alter the ordering of the selected audio clips within the presentation playlist in order to provide a customized vehicle presentation directed to features that may be more likely valued by the viewer.

The secondary audio rankings 354 may be preset, where different rankings of the audio clip are determined based on the relevance of features covered by the audio clip to (i) an intended use of the vehicle, (ii) the geographic location of the vehicle, and/or (iii) the viewer profile. Where more than one audio ranking is applied in the selection and/or ordering of audio clips for the vehicle presentation, it is contemplated that the rankings of each audio clip may be averaged, may be weighted to favor a particular factor (e.g., audio clips ranked in accordance with the viewer profile having a greater weighting than audio clips ranked in accordance with geographic location of the vehicle; audio clips ranked in accordance with geographic location having a greater weighting than audio clips ranked in accordance with vehicle category, etc.). Herein, the highest ranked audio clips are selected as part of the presentation playlist, and one or more images (sometimes referred to as "image(s)") of the vehicle are synchronized for display at a selected time(s) during playback of each selected audio clip.

As non-limiting illustrative examples, where the vehicle of interest (VIN) is directed to a "compact" vehicle category, the playlist/configuration generation logic 170 may utilize a secondary audio ranking 354 that assigns higher rankings to audio clips directed to cost efficiencies along with similar features shared by larger-sized vehicles (e.g., miles per gallon, extended warranties, hybrid options, etc.). As a result, the playlist/configuration generation logic 170 generates a playlist that includes an overweighting of audio clips directed to features that may be valued by customers shopping for compact vehicles. Similarly, where the VIN is directed to a "truck" vehicle category, the playlist/configuration generation logic 170 may utilize another secondary audio ranking that assigns higher rankings to audio clips directed to "work" uses (e.g., towing capacity, engine type, bed size, cargo capacity, etc.). As a result, the playlist/configuration generation logic 170 would generate a playlist that includes an overweighting of audio clips directed to features that may be valued by customers shopping for trucks.

As another non-limiting illustrative example, in accordance with an "outdoor enthusiast" viewer profile (e.g., based on review of certain accessories such as bicycle racks or trailer hitches during the communication session, recent browsing history directed to hiking trail guides, national park websites, desert escapes, etc.), the playlist/configuration generation logic 170 may utilize a secondary audio ranking directed to the "outdoor enthusiast" profile. This secondary audio ranking assigns higher rankings to audio clips directed to vehicle features associated with outdoor activities (e.g., towing capacity, all-wheel drive, cargo capacity, etc.). As a result, the playlist/configuration generation logic 170 generates a playlist that includes an overweighting of audio clips directed to vehicle features associated with outdoor activities. Similarly, in accordance with a stay-home parent viewer profile, the playlist/configuration generation logic 170 may utilize a different secondary audio ranking that assigns higher rankings to audio clips directed to vehicle features associated with daily or weekly household activities such as the transportation of kids or shopping (e.g., safety rating, passenger occupancy, cargo capacity, roof rack accessories, etc.). As a result, the playlist/configuration generation logic 170 generates a playlist that includes an overweighting of audio clips directed to household management.

Examples of the audio metadata within the master feature object 350 may include, but is not limited or restricted to the following:

| MASTER FEATURE OBJECT | |
|---|---|
| Comparison code mapping 351 | Code that identifies whether the feature is part of the vehicle (received comparison codes match a prescribed pattern) |
| Audio Text 352 | Text wording of the audio clip |
| Audio Category 355 | Defined category of the vehicle (navigation, interior, exterior, etc.) |
| Audio Type 356 | Defined how audio is being used (e.g., introduction, feature, campaign, etc.) |
| Audio Title 357 | Selected title for the audio clip |
| Audio ranking - default 353 | Default ranking for the audio clip for use in selection/ordering of the audio clip |
| Audio ranking(s) - secondary 354 | Alternative ranking(s) for the audio clip based on parameters associated with the audio clip |

Figure 3E:
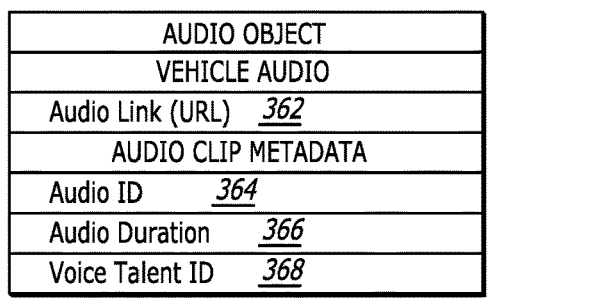
FIG. 3E is an illustrative embodiment of stored contents of a data structure associated with an audio object of the audio objects of FIG. 2C.

Referring now to FIG. 3E, an illustrative embodiment of stored contents of a data structure associated with the audio object 360 is shown. Herein, the audio object 360 includes a link to an audio clip (audio link 362) that corresponds to an audio recording of the audio text 352 set forth in the corresponding master feature object 350. As an illustrative example, the audio object 360 may include the audio link 362 operating as (i) the introduction used for the multimedia presentation (or portion thereof), (ii) the conclusion used for the multimedia presentation (or portion thereof), or (iii) a general advertisement within the multimedia presentation in order to highlight awards, accolades, or other supportive statements concerning the vehicle.

Additionally, or in the alternative, the audio clip accessed through the audio link 362 may partially or completely describe a feature of the vehicle in accordance with a text description of the feature set forth in the audio text entry 352 of the master feature object 350 of FIG. 3D. For instance, the audio clip corresponds to the audio text (e.g., audio stating "8-way adjustable leather heated seats with lumbar support"; audio stating "twelve Bose® speaker system"; etc.). Alternatively, the audio clip may describe a characteristic of the vehicle (e.g., towing capacity, cargo capacity, gas mileage, etc.).

Herein, besides the audio link 362, the audio object may include metadata directed to the audio clip (sometimes referred to as "audio clip metadata"). Examples of the audio clip metadata may include, but is not limited or restricted to the following:

| AUDIO OBJECT | |
|---|---|
| Audio Link (URL) 362 | Link to an audio clip corresponding to the audio text |
| AUDIO CLIP METADATA | DESCRIPTION (FUNCTIONALITY) |
| Audio ID 364 | Identifier of the audio clip |
| Audio Duration 366 | Duration of the audio clip |
| Voice Talent ID 368 | Identifier of person recording the audio clip |

The audio clip metadata for each vehicle audio link 362 is used by a script running in the playlist/configuration generation logic 170 to form a presentation playlist, where the ordering of the audio clips and the duration (audio duration 366) of each audio clip forms a timeline for the resultant vehicle presentation. The ordering of the audio clips may be determined by the audio rankings 353 or 354 set forth in the master feature object 350.

Figure 3F:
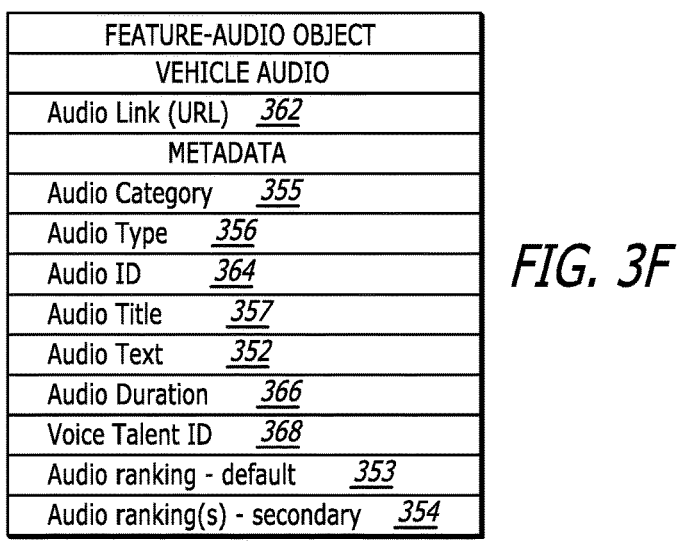
FIG. 3F is an illustrative embodiment of stored contents of a data structure associated with a feature-object object associated with the master feature object of FIG. 3D and the audio object of FIG. 3E.

Referring now to FIG. 3F, an illustrative embodiment of stored contents of a data structure associated with the feature-audio object 370 is shown. Herein, the feature-audio object 370 represents information associated with a particular audio clip. As shown, feature-audio object 370 includes the audio link 362 that describes a feature of the vehicle. As an illustrative example, the audio link 362 may have the form of (i) an introduction used for the multimedia presentation (or portion thereof), (ii) a conclusion used for the multimedia presentation (or portion thereof), or (iii) a general advertisement within the multimedia presentation in order to highlight awards, accolades, or other supportive statements concerning the vehicle. Additionally, or in the alternative, the audio clip accessed through the audio link 362 of the feature-audio object 370 may partially or completely describe a feature (e.g., "8-way adjustable leather heated seats with lumbar support") of the vehicle with a text description of the feature (audio text 352) contained in the feature-audio object 370 as well.

Herein, the feature-audio object 370 includes at least a portion of the metadata contained in the audio metadata within the master feature object 350 and the audio clip metadata within the corresponding audio object 360. Examples of the metadata of the feature-audio object 370 may include, but is not limited or restricted to the following:

| FEATURE-AUDIO OBJECT | |
|---|---|
| Audio Link (URL) 362 | Link to an audio clip corresponding to the audio text |
| METADATA | DESCRIPTION (FUNCTIONALITY) |
| Audio Category 355 | Defined category of the vehicle (navigation, interior, exterior, etc.) |
| Audio Type 356 | Defined how audio is being used (e.g., introduction, feature, campaign, etc.) |
| Audio ID 364 | Identifier of the audio clip |
| Audio Title 357 | Selected title for the audio clip |
| Audio Text 352 | Text wording of the audio clip |
| Audio Duration 366 | Duration of the audio clip |
| Voice Talent ID 368 | Identifier of person recording the audio clip |
| Audio ranking - default 353 | Default ranking for the audio clip for use in selection/ordering of the audio clip |
| Audio ranking(s) - secondary 354 | Alternative ranking(s) for the audio clip based on parameters associated with the audio clip |

Referring still to FIG. 3F, the audio rankings include a default audio ranking 353 and/or one or more secondary audio rankings 354. In some situations, it may be useful to simply provide a multimedia presentation that highlights certain features of a vehicle. As a result, in the assembly of the presentation playlist 150 of FIG. 1, the ordering of the audio clips, from among all of the audio clips within the audio objects pertaining to features of the vehicle, may be in accordance with the default audio ranking 353. However, in other situations, it may be useful to utilize a secondary audio ranking 354 when selecting and ordering audio clips to form the vehicle presentation 150 of FIG. 1. Each of the secondary audio ranking 354 may correspond to a ranking in response to particular presentation adjustment factor, such as (i) the vehicle category for the vehicle uniquely identified by the VIN, (ii) dealer location, (iii) viewer location, and/or (iv) viewer profile. As mentioned above, the metadata gathered for use in selecting the viewer profile may be obtained from cookies stored within a network device that is used by the viewer to access the presentation player and/or from navigation activity by the viewer.

Referring to FIG. 4, an illustrated embodiment of a process for generating the presentation playlist 150 is described, where the presentation playlist 150, when processed by the presentation player widget 140 located on a network device, controls the selection and ordering of multimedia elements forming the vehicle presentation. Herein, the third data store 195 is configured to maintain program/dealer objects 270, VIN templates 275, scripts 265, vehicle objects 280, master feature objects 286, audio objects 287, and vehicle catalog information 290. The control logic 180 is responsible for monitoring changes in storage state of the third data store 195, including any attempts to change content stored in the third data store 195. Such changes may include any modification of content within (a) the stored vehicle objects 280, (b) the stored master feature objects 286, (c) the stored audio objects 287, or (d) the program/dealer objects 270. Also, such changes may include the deletion/addition of any of the dealer objects 270, vehicle objects 280, master feature objects 286, audio objects 287 or vehicle catalog information 290.

In response to detecting an attempt to modify, add or delete content within the program/dealer objects 270, vehicle objects 280, master feature objects 286, audio objects 287 and/or vehicle catalog information 290 (as represented by sense line 401), the control logic 180 recovers the VIN 402 and the Dealer_ID 404 (i.e. an identification of the dealer for the vehicle identified by the VIN 402) that accompanies a request 400 to change stored content. The control logic 180 provides the VIN 402 and Dealer_ID 404 to the playlist/configuration generation logic 170.

Upon receipt of information from the control logic 180, the playlist/configuration generation logic 170 transmits a request message 406 passing the Dealer_ID 404 to first multimedia (program/dealer) service logic $175_1$. In response to receipt of the request message 406, including the Dealer_ID 404, the first multimedia service logic $175_1$ recovers a program/dealer object referenced by the Dealer_ID 404 from the program/dealer objects 270. The recovery may involve a search of the stored program/dealer objects 270 for a program/dealer object including the dealer identifier that matches the Dealer_ID 404 (e.g., program/dealer object 300). Upon recovery, the first multimedia service logic $175_1$ returns the program/dealer object 300 to the playlist/configuration generation logic 170.

Additionally, the first multimedia service subsystem $175_1$ uses the Dealer_ID 404 to determine whether there are any dealer-specific rules in the formation of the presentation playlist. This determination may involve a search of the stored VIN templates 275 for a VIN template associated with a specific dealer uniquely identified by the Dealer_ID 404 (e.g., VIN template 320). If stored, the VIN template 320 associated with the specific dealer is provided to the playlist/configuration generation logic 170.

In response to receipt of the VIN 402, the playlist/configuration generation logic 170 also provides a request message 408, including the extracted VIN 402, to the second multimedia service logic $175_2$. The second multimedia service logic $175_2$ locates a vehicle object having a VIN entry field corresponding to the VIN 402 (e.g., vehicle object 330). After recovery of the vehicle object 330, the second multimedia service logic $175_2$ provides a request message 410 to the third multimedia (audio) service logic $175_3$ to commence recovery of one or more feature-audio objects 370 associated with the vehicle object 330. The request message 410 may include the vehicle object (VO) 330 and a background audio identifier (BA_ID) 420.

When present, VIN template 320 may identify background audio (entry 327 of VIN template 320 in FIG. 3B) for the vehicle presentation. The background audio identifier (BA_ID) 420 may be provided to the third multimedia service logic $175_3$ along with the vehicle object 330. Herein, the third multimedia service logic $175_3$ utilizes the background audio identifier 420 to retrieve one or more background audio links 440 stored in the audio data 285 (represented as background audio 440). Alternatively, when the specific dealer VIN template is not stored or the VIN template 320 fails to identify the background audio, the background audio identifier 420 is set to retrieve a default audio background link 440 stored in the audio data 285.

Referring to FIG. 5, an illustrative embodiment of the flow for creation of one or more feature-audio objects by the third multimedia service logic $175_3$ of the content generation subsystem 125 is shown. In general, the third multimedia service logic $175_3$ includes an automated, audio clip retrieval process that, in response to receipt as input of at least a VIN associated with a particular vehicle, produces feature-audio objects that include one or more audio clips that describe features for that particular vehicle. Herein, each audio clip normally corresponds to a Uniform Resource Locator (URL) link that enables access to stored audio, normally at a location different than the storage subsystem 130 of FIG. 1 (e.g., cloud services 105 of FIG. 1). Herein, the third multimedia service logic $175_3$ includes object analysis logic 500, VIN analysis logic 510, a metadata engine 520, master feature analysis logic 530 and audio analysis logic 540.

The object analysis logic 500 is configured to receive the vehicle object 330 and parse information within the vehicle object 330 to recover the VIN 331 and the unstructured text 344 from the vehicle object 330. The VIN 331 and the unstructured text 344 are located in entries of the vehicle object 330 as illustrated in FIG. 3C. The object analysis logic 500 provides the VIN 331 to the VIN analysis logic 510 while the unstructured text 344 is passed to the metadata engine 520.

As shown, the VIN analysis logic 510 uses the received VIN 331 to recover, via a VIN decoder service 550, vehicle option codes 560 from build data, namely a collection of data normally provided by a particular OEM that correlates a VIN with vehicle option codes that may identify the vehicle trim and the factory-ordered options. Each "vehicle option code" is a prescribed value that is used by the particular OEM to identify an option installed on a vehicle identified by the VIN. These options may include standard options that are available to the vehicle given its particular vehicle trim (e.g., automatic transmission, 19-inch wheels, cloth interior, etc.) and factory-ordered (non-standard) options that may constitute upgrades to the vehicle (e.g., leather interior, heated seats, lumbar support seating, 21-inch wheels, etc.).

In accordance with one embodiment of the disclosure, the VIN analysis logic 510 may obtain the vehicle option codes 560 by decoding the VIN 331, namely an analysis of the alphanumeric characters of the VIN 331 itself, where these alphanumeric characters provide information that identifies the vehicle option codes 560 associated with the specific vehicle uniquely identified by the VIN 331. In accordance with another embodiment, however, the VIN analysis logic 510 may conduct a lookup of the build data using the VIN 331 as a lookup parameter. Based on the VIN 331, the VIN analysis logic 510 receives the vehicle option codes 560 that are installed on the vehicle identified by the VIN 331.

In response to receipt of the vehicle option codes 560, the VIN analysis logic 510 provides the same to the metadata engine 520. Based on the vehicle option codes 560 (with optional unstructured text 344), the metadata engine 520 (configured as a run-time vocabulary engine "RVE") produces metadata 570 such as comparison codes each associated with one or more of the vehicle option codes 560. Each "comparison code" provides specific information pertaining to the vehicle identified by the VIN. The specific information may include at least one answer to a specific question, where a plurality of comparison codes collectively corresponds to a feature of the vehicle. Optionally, the metadata may further include "brand codes," which identify the brand name of certain components.

As previously stated, the unstructured text 344 may include information that identifies additional features (accessories) that are added to the vehicle after manufacture. These additional features may be added by the dealer or by a prior owner when the vehicle is a used or certified vehicle. The metadata engine (RVE) 520 may use the unstructured text 344 to produce additional comparison codes associated with the added features. Additionally the unstructured text 344 may identify removed features, where the information may be used to refrain from producing comparison codes for certain features that have been removed from the vehicle.

As further shown in FIG. 5, the master feature analysis logic 530 is configured to determine, based at least on the retrieved comparison codes 570 (and optionally brand codes), what master features pertain to the vehicle. As stated above, according to one embodiment of the disclosure, a "master feature" is a text description of a feature of the vehicle, which may correspond by an aggregate of a plurality of comparison codes (and optionally brand codes).

As an illustrative, non-limiting example, a master feature may be a text description "8-way adjustable leather heated seats with lumbar support." The master feature is present on the vehicle when five (5) comparison codes include answers that comport with the master feature, namely a first comparison code (c-code 1) may identify whether the driver and passenger seating is adjustable (adjustable seats); a second comparison code (c-code 2) may identify the number of adjustments in the seating (8); a third comparison code (c-code 3) may identify the type of interior (leather); a fourth comparison code (c-code 4) may identify that the driver and passenger seating is heated; and a fifth comparison code (c-code 5) may identify driver and passenger seating having lumbar support.

Of course, it is contemplated that the master feature objects, which are recovered from the comparison codes that are produced by the RVE 520 based on vehicle option codes 560, may include text descriptions that are directed to subject matter other than physical features of the vehicle. For instance, the text descriptions may be directed to awards (or other accolades), reviews by publications (e.g., Car and Driver™ magazine, Consumer Reports™ magazine, etc.), or other materials that may be useful for advertisement purposes. These types of master feature objects may be one of the master features 286 that is triggered by comparison codes that identify the vehicle (e.g., make/model or make/model/trim). Alternatively, these types of master feature objects may be produced from the unstructured text 344 input into the RVE 520, where a portion of the correlation codes are directed to the text description concerning the awards, reviews or advertisements.

As another illustrative, non-limiting example, a master feature (or a plurality of master features collectively) may include a text description "Winner of Luxury Car of the Year by JD Powers" The master feature is present based on the values of three (3) comparison codes that comport with this master feature, namely comparison codes (c-code 11; c-code 12; c-code 13) may identify a certain make model and trim that a particular car with this award.

According to one embodiment of the disclosure, the master feature analysis logic 530 may determine what master features pertain to the vehicle identified by the VIN 331 by accessing comparison code mapping entries within each of the master feature objects 286. A comparison code mapping entry of a master feature object identifies one or more comparison codes that represent the feature associated with that master feature object. A subset 580 of the stored master feature objects 286 (sometimes referred to as the "recovered master feature objects 580") is obtained and routed to the audio analysis logic 540.

For instance, as an illustrated example, the master feature object 350 may correspond to a master feature with a text description (audio text 351) "8-way adjustable leather heated seats with lumbar support," as referenced above. The comparison code mapping 351 of the master feature object 350 may correspond to the value (1/8/0/1/1) for the five (5) comparison codes (c-codes 1-5) as described above: "1" (yes); "8" (number of adjustments); "0" (leather=0; cloth=1); "1" (non-heated=0; heated=1); "1" (no lumbar support="0"; lumbar support="1"). If the value for the comparison code mapping 351 matches a subset of the comparison codes 570 provided by the RVE 520, the master feature object 350 is retrieved by the master feature analysis logic 530 and provided as part of the recovered master feature objects 580 to the audio analysis logic 540.

According to another embodiment of the disclosure, the master feature analysis logic 530 may create a tree-like mapping of comparison codes associated with the master features pertaining to the stored master feature objects 286. The recovered master feature objects 580 are identified by analyzing the tree-like mapping, and providing the recovered master feature objects (a subset of the master feature objects 286) that match segments of the comparison codes 570 provided from the RVE 520. The recovered master feature objects 580 are provided to the audio analysis logic 540.

For each recovered master feature objects 580 that pertains to the vehicle, the audio analysis logic 540 may recover a corresponding audio clip along with metadata pertaining to that audio clip (collectively referred to as an "audio object" 590). Thereafter, the audio link and certain metadata within each master feature object 580 (e.g. master feature object 350) along with its corresponding audio object 590 may be extracted to produce one or more feature-audio objects 595 that are provided to playlist/configuration generation logic 170.

As an illustrative example, where master feature object 350 is part of the recovered master feature objects 580, the audio object 360 would be recovered by the audio analysis logic 540 as the audio object 360 corresponds to the master feature object 350. This recovery may involve a comparison of the audio text 352 within the master feature object 350 to content within the audio link 362. Upon detecting a comparison, the audio analysis logic 540 produces the feature-audio object 370 that is provided to the playlist/configuration generation logic 170.

Thereafter, the playlist/configuration generation logic 170 may generate a plurality of presentation playlists by altering the selection and ordering of audio clips associated with the feature-audio objects 595 in accordance with certain presentation adjustment factors provided as input. These presentation adjustment factors may include, but are not limited or restricted to prescribed static factors (e.g., dealer location, vehicle category, etc.) and/or dynamic factors (e.g., viewer profiles—profiles that are used to classify certain types of the viewers requesting the presentation playlist).

Referring back to FIG. 4, the playlist/configuration generation logic 170 is communicatively coupled to the first multimedia service logic $175_1$, the second multimedia service logic $175_2$, and the third multimedia service logic $175_3$. The first multimedia service logic $175_1$ provides the program/dealer object 300 and VIN template 320 (when stored) to the playlist/configuration generation logic 170. Based in part of the Dealer_ID 404 provided with request message 412, the dealer-specific script 260 may be retrieved and utilized by the playlist/configuration generation logic 170. If no dealer-specific script is present, the playlist/configuration generation logic 170 fetches a default script. The second multimedia service logic $175_2$ provides the vehicle object 330 associated with a targeted vehicle for which presentation playlists are to be generated while the third multimedia service logic $175_3$, which produces one or more feature-audio objects 595 associated with the features of the vehicle objects 330 along with background audio 440, as described above.

Figure 6:
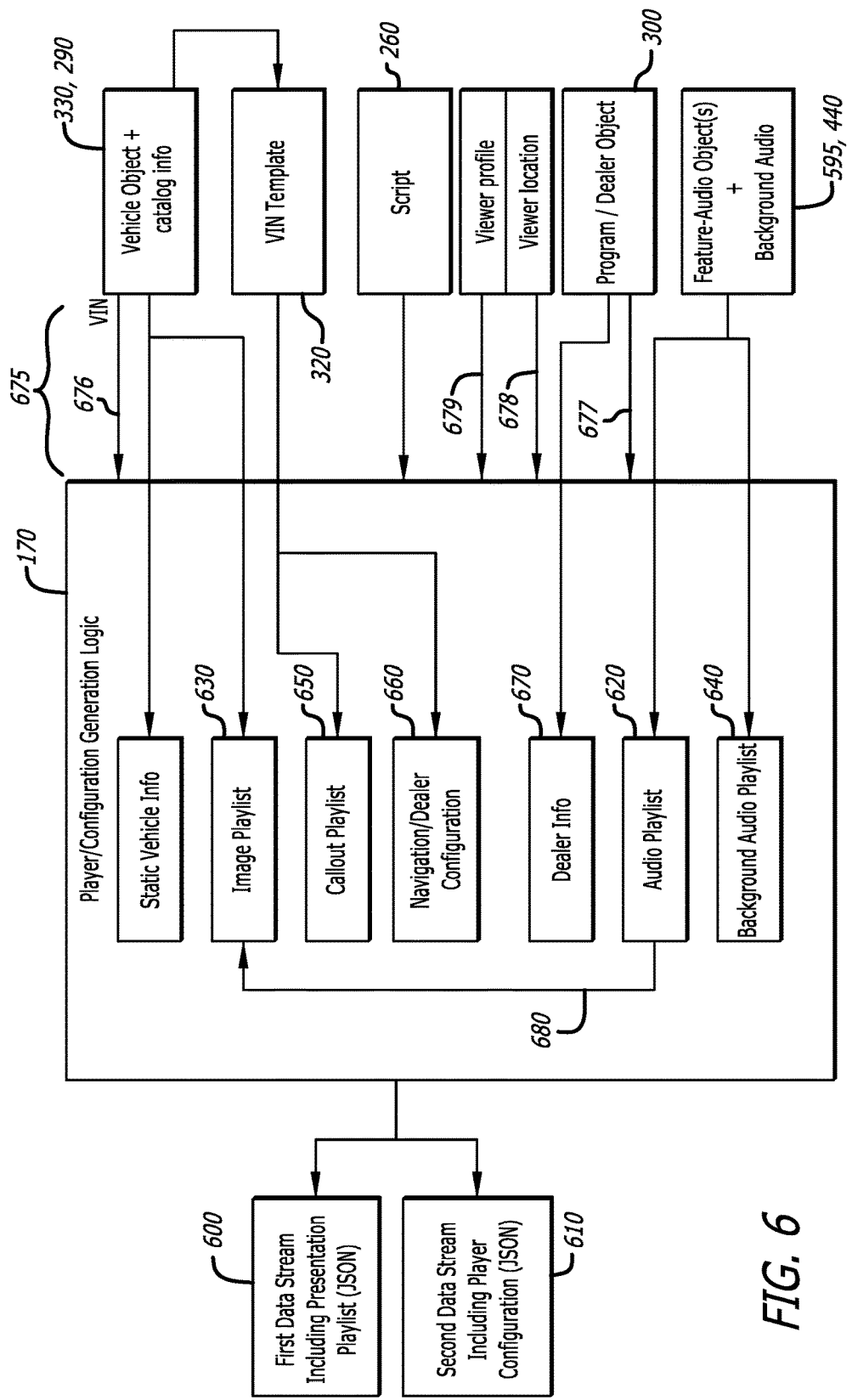
FIG. 6 is an illustrative embodiment of the operability of the playlist/configuration generation logic of FIG. 4.

Referring now to FIG. 6, a more detailed illustrative embodiment of the operability of the playlist/configuration generation logic 170 is shown. Herein, the playlist/configuration generation logic 170 is configured to retrieve the script 260 that is configured in accordance with the presentation criteria selected by the dealer identified by the received program/dealer object 320. When processed by the playlist/configuration generation logic 170, the script 260 is configured to generate a first data stream 600 that includes the presentation playlist 150, and a second data stream 610 that includes the player configuration 152.

Upon receiving the vehicle object 330 (and optional catalog information 290 associated with the vehicle), one or more audio objects 595 corresponding to the vehicle object 330, background audio link 440, program/dealer object 300, and/or VIN template 320 (where applicable), the playlist/configuration generation logic 170 may search, as represented by inter-logic communications, for a dealer specific script that includes dealer-selected rules in the formation of components of both the presentation playlist 150 and the player configuration 152. Otherwise, a default script is utilized by the playlist/configuration generation logic 170. After determination, the dealer-specific (or default) script 260 is utilized by the playlist/configuration generation logic 170 to produce the first data stream 600 including the corresponding presentation playlist 150 and the second data stream 610 including player configuration 152. The components of the presentation playlist 150 may include an audio playlist 620, an image playlist 630, a background audio playlist 640, and a callout playlist 650. The components of the player configuration 152 may include a navigation/menu configuration 660 and dealer information 670.

When generating the audio playlist 620 forming part of the presentation playlist 150 of the first data stream 600, the script 260 is configured to parse through the one or more feature-audio objects 595 and select and order audio clips associated with the feature-audio objects 595 based on a default ranking or a secondary ranking. The use of one or more secondary rankings for selection and ordering of the audio clips may be based, at least in part, on the presence of information associated with one or more presentation adjustment factors 675. These presentation adjustment factors 675 may include, but are not limited or restricted to (i) a category of the vehicle (e.g., luxury, SUV, compact, etc.) assigned to the VIN, (ii) a location of the dealer, (iii) a computed location of the viewer, and/or (iv) a profile (e.g., navigation activities and/or interests) of the viewer who is requesting the multimedia presentation for the particular VIN, as shown.

More specifically, with respect to the selection and ordering of the audio clips associated with the one or more feature-audio objects 595, according to one embodiment of the disclosure, information associated with a first presentation adjustment factor (represented by a first inter-logic communications 676) may be obtained by determining the VIN contained in the one or more vehicle objects 330. From the VIN, it is contemplated that the make/model of the vehicle may be obtained, and thereafter, a lookup of a relational database (not shown) maintaining the make/model and category may be conducted. Thereafter, a category may be ascertained for the particular VIN.

Additionally, information associated with a second presentation adjustment factor 677 (i.e., location of the dealer) may be obtained from content within the program/dealer object 300, as represented by a second inter-logic communications 677. Also, as represented by a third and fourth inter-logic communications 678 and 679, the computed location of the viewer and/or the viewer profile(s) may be considered in generating multiple versions of the presentation playlist 150, where such information may be pre-stored in the second (profile) data store (not shown). The particular viewer-to-profile relation may be maintained within the second data store, where the relation is assigned (and may be subsequently reaffirmed or even altered) based on information from the user analytic logic 165 of FIG. 1.

Upon selecting and ordering the audio clips to produce the audio playlist 620, the script 260 further generates the image playlist 630 by coordinating the display of one or more images within the received vehicle objects 330 with playback of a particular audio clip, as denoted by inter-logic communications 680. The selection and ordering of the audio clips provide a timeline from which the background audio playlist 640 (e.g., durations for one or more background audio tracks played back) as well as a timeline and location for the rendering of text and image overlays, animation and/or logos provided by the callout playlist 650. The background audio playlist 640 is based on the background audio 440 while the callout playlist 650 is based on information within the dealer-specific VIN template 320. As a result, the temporal information (based on the timeline provided by the one or more feature-audio objects 595) produces, at least in part, the first data stream 600 including the presentation playlist 150. The presentation playlist 150 is stored in the first data store 185.

Similarly, the script 260 may be configured to produce the second data stream 610, including the player configuration 152, based on the navigation/menu configuration 660 formulated based on information from the VIN template 320 along with dealer information from the program/dealer object 300. Illustrative pseudo-code of the player configuration 152 of the second data stream 610 and the presentation playlist 150 of the first data stream 600 are illustrated in FIGS. 7A, 7B and 7C. Herein, the presentation playlist 150 and its corresponding player configuration 152 are stored in the first data store 185, which is accessible by playlist/configuration retrieval logic 160 responsive to the received vehicle presentation request message 142, as shown in FIG. 1.

In the foregoing description, the invention is described with reference to specific exemplary embodiments thereof. However, it will be evident that various modifications and changes may be made thereto without departing from the broader spirit and scope of the invention as set forth in the appended claims.

What is claimed is:

1. A network device, comprising:
   one or more processors; and
   a memory communicatively coupled to the one or more processors, the memory including
   (i) a vehicle analysis logic configured to, after receiving information that identifies a vehicle and during execution by the one or more processors, automatically determine a first plurality of vehicle option codes based on the information that identifies the vehicle, each vehicle option code includes a prescribed value that is used by a manufacturer of the vehicle to identify an option installed on the vehicle,
   (ii) logic configured to, after receiving the vehicle option codes and during execution by the one or more processors, automatically translate the vehicle option codes into information that is used in recovery of a plurality of text descriptions directed to features of the vehicle, and
   (iii) audio analysis logic configured to, during execution by the one or more processors, automatically determine a first plurality of audio clip links corresponding to the plurality of text descriptions, wherein at least a second plurality of the audio clip links being used to form a presentation playlist that is configured to control retrieval and playback of audio clips associated with a multimedia presentation of the vehicle, the second plurality of audio clip links being a portion of the first plurality of audio clip links.

2. The network device of claim 1, wherein the information that identifies the vehicle includes at least a vehicle identification number.

3. The network device of claim 2, wherein the memory further comprises a playlist controller that is configured, after execution by the one or more processors, to provide the information identifying the vehicle to the vehicle analysis logic in response to detection of a change in storage state of a data store provided from a control logic that is separate from the memory.

4. The network device of claim 3, wherein the control logic monitors for the change in storage state of the data store by at least monitoring for either (i) a request for storage of a vehicle object within the data store or (ii) a request for updating the vehicle object currently stored within the data store, extracting the vehicle identification number and an identifier of a dealer associated with the vehicle from the request, and signaling the playlist controller using a message including both the vehicle identification number and the dealer identifier.

5. The network device of claim 4, wherein responsive to receipt of the message including both the vehicle identification number and the dealer identifier, the playlist controller to obtain the vehicle object and provide the vehicle object as the information that identifies the vehicle to the vehicle analysis logic.

6. The network device of claim 4, wherein responsive to receipt of the message including both the vehicle identification number and the dealer identifier, the playlist controller to use to dealer identifier to determine whether the dealer is associated with any dealer-specific rules in a formation of the presentation playlist.

7. A system comprising:
a storage subsystem including a plurality of data stores including a first data store and a second data store; and
a content generation subsystem communicatively coupled to the storage subsystem, the content generation subsystem comprises
a playlist controller configured to generate a presentation playlist for storage in the first data store, the presentation playlist being used to control retrieval and playback of a first plurality of audio clips along with a second plurality of displayable images to produce a multimedia presentation of a vehicle, and
multimedia service logic that, in response to receiving at least a vehicle identification number from the playlist controller, (i) automatically determines, without human intervention, vehicle option codes associated with the vehicle, each vehicle option code includes a prescribed value that is used by a manufacturer of the vehicle to identify an option installed on the vehicle, (ii) automatically translate the vehicle option codes into information that is used in recovery of a plurality of text descriptions directed to features of the vehicle, and (iii) automatically determine a plurality of audio clip links corresponding to the plurality of text descriptions,
wherein the plurality of audio clip links being lesser in number than the first plurality of audio clips.

8. The system of claim 7, wherein the content generation subsystem further comprises a control logic that monitors for change in storage state of the second data store and sends a message to the playlist controller upon detection of the change in the storage state, the message includes the vehicle identification number and information that identifies a dealer causing the change in the storage state of the second data store.

9. The system of claim 8, wherein the control logic monitors for the change in storage state of the third data store by at least (A) monitoring for either (i) a request for storage of a vehicle object within the third data store or (ii) a request for updating the vehicle object currently stored within the data store, (B) extracting the vehicle identification number and the information that identifies the dealer, and (C) providing the playlist controller with the vehicle identification number and the information that identifies the dealer.

10. The system of claim 9, wherein responsive to receipt of the message including both the vehicle identification number and the information that identifies the dealer, the playlist controller to obtain the vehicle object and provide the vehicle object that includes at least the vehicle identification number to a vehicle analysis logic of the multimedia services logic.

11. The system of claim 10, wherein responsive to receipt of the message including both the vehicle identification number and the dealer identifier, the playlist controller to determine, using the information that identifies the dealer, whether the dealer is associated with any dealer-specific rules in a formation of the presentation playlist.

12. The system of claim 10, wherein the playlist controller to generate the playlist by selecting and ordering of the first plurality of audio clips in accordance with an audio clips that are directed to features of the vehicle that are commonly used for a geographic location of the vehicle.

13. The system of claim 10, wherein the content retrieval subsystem further comprises a playlist retrieval logic that relies on metadata from a vehicle presentation request message to select the presentation playlist for retrieval.

14. The system claim 13, wherein the metadata includes a first metadata that is used for authenticating a subscription-based access to the playlist retrieval logic, a second metadata that identifies a type of network device that initiates the vehicle presentation request message, and a third metadata that includes a cookie identifier assigned to a viewer associated with the network device.

15. The system of claim 7, wherein the playlist controller to generate the playlist by selecting and ordering of the first plurality of audio clips in accordance with a ranking assigned to each of the first plurality of audio clips that are set for a plurality of viewer profiles.

16. The system of claim 7 further comprising a content retrieval subsystem communicatively coupled to the first data store including one or more presentation playlists, the content retrieval subsystem to obtain the presentation playlist for a network device that is to generate the multimedia presentation of the vehicle for display.

* * * * *